(12) United States Patent
Atsumi

(10) Patent No.: US 8,208,151 B2
(45) Date of Patent: Jun. 26, 2012

(54) FAX DATA TRANSMISSION DEVICE AND FAX DATA TRANSMISSION SYSTEM

(75) Inventor: Tomoyuki Atsumi, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 2082 days.

(21) Appl. No.: 10/668,149

(22) Filed: Sep. 24, 2003

(65) Prior Publication Data

US 2005/0036167 A1 Feb. 17, 2005

(30) Foreign Application Priority Data

Sep. 27, 2002 (JP) ................. 2002-282628

(51) Int. Cl.
*G06F 15/00* (2006.01)
*G06F 15/16* (2006.01)
*H04N 1/00* (2006.01)

(52) U.S. Cl. .............. 358/1.15; 358/407; 358/444

(58) Field of Classification Search .......... 358/401–403, 358/1.15, 407, 444, 440, 405; 709/206, 204, 709/205, 207; 379/100, 265
See application file for complete search history.

(56) References Cited

U.S. PATENT DOCUMENTS

| | | | | | |
|---|---|---|---|---|---|
| 5,224,156 | A | * | 6/1993 | Fuller et al. | 379/100.08 |
| 5,720,014 | A | * | 2/1998 | Ikeda et al. | 358/1.15 |
| 5,790,639 | A | * | 8/1998 | Ranalli et al. | 379/100.08 |
| 5,937,050 | A | * | 8/1999 | Yue et al. | 379/100.06 |
| 5,946,386 | A | * | 8/1999 | Rogers et al. | 379/265.09 |
| 6,825,955 | B1 | * | 11/2004 | Shibata | 358/402 |
| 6,850,972 | B1 | * | 2/2005 | Itoh | 709/219 |
| 6,876,462 | B2 | * | 4/2005 | Okada et al. | 358/1.15 |
| 7,068,384 | B1 | * | 6/2006 | Hou | 358/1.15 |
| 7,199,906 | B1 | * | 4/2007 | Tamura | 358/400 |
| 2002/0018237 | A1 | * | 2/2002 | Okada et al. | 358/1.15 |
| 2002/0018245 | A1 | * | 2/2002 | Saito et al. | 358/468 |
| 2002/0024686 | A1 | * | 2/2002 | Uchiyama et al. | 358/407 |
| 2002/0051146 | A1 | * | 5/2002 | Tanimoto | 358/1.9 |
| 2002/0059383 | A1 | * | 5/2002 | Katsuda | 709/206 |

(Continued)

FOREIGN PATENT DOCUMENTS

JP 10-191013 7/1998

(Continued)

OTHER PUBLICATIONS

Decision of Refusal, dated Sep. 25, 2007, issued in corresponding Japanese Patent Application No. 2002-282628, and translation thereof.

(Continued)

*Primary Examiner* — King Poon
*Assistant Examiner* — Allen H Nguyen
(74) *Attorney, Agent, or Firm* — Buchanan Ingersoll & Rooney PC

(57) ABSTRACT

A fax data transmission device receives fax data, and stores it together with an identifier for identifying the fax data. The fax data transmission device sends receipt information which includes the identifier and a notification that the fax data identified by the identifier has been received, to an external device. The fax data transmission device receives destination information relating to a destination to which the fax data should be forwarded, as a reply to the receipt information. The fax data transmission device sends the fax data to the destination specified based on the destination information.

8 Claims, 38 Drawing Sheets

U.S. PATENT DOCUMENTS

| | | | |
|---|---|---|---|
| 2002/0063882 A1* | 5/2002 | Sekiguchi | 358/1.15 |
| 2002/0087764 A1* | 7/2002 | Yokoyama | 710/104 |
| 2002/0176108 A1* | 11/2002 | Jeon | 358/1.15 |
| 2003/0048484 A1* | 3/2003 | Seki et al. | 358/402 |

FOREIGN PATENT DOCUMENTS

| | | |
|---|---|---|
| JP | 2000-151890 | 5/2000 |
| JP | 2000-295271 | 10/2000 |
| JP | 2001-298576 | 10/2001 |
| JP | 2002-007280 | 1/2002 |
| JP | 2002-281226 | 9/2002 |

OTHER PUBLICATIONS

Dismissal of Amendment, dated Sep. 25, 2007, corresponding to Japanese Patent Application No. 2002-282628, and translation thereof.

Notification of Reasons for Refusal issued in corresponding Japanese Patent Application No. 2002-282628, and translation thereof.

* cited by examiner

FIG.4A (Header)
From : MFP230@MLT.co.jp
To : IMD410@MLT.co.jp
Subject : FAX received
Date : Thu, 8 Aug 2002 12:00:00

(Message Body)
Massage-ID : 20020808115600.001.fax310.MLT
FAX=
E-mail=
Please reply without deleting the above.
FAX Number : 06-6100-1234
FAXID : FAX310

FIG.4B (Header)
From : MFP230@MLT.co.jp
To : IMD410@MLT.co.jp
Subject : IFAX received
Date : Thu, 8 Aug 2002 12:00:00

(Message Body)
Massage-ID : <20020808115600.AA01886@ifax.MLT.co.jp>
FAX=
E-mail=
Please reply without deleting the above.
From : IFAX120@ifax.MLT.co.jp
Subject : 1234MLT Meeting Schedule

FIG.5A (Header)
From : IMD410@MLT.co.jp
Reply-To : MFP230@MLT.co.jp
Subject : Re : FAX received
Date : Thu, 8 Aug 2002 12:10:00

(Message Body)
Massage-ID : 20020808115600.001.fax310.MLT
FAX=
E-mail=IFAX110@ifax.MLT.co.jp
Please reply without deleting the above.
FAX Number : 06-6100-1234
FAXID : FAX310

FIG.5B (Header)
From : IMD410@MLT.co.jp
Reply-To : MFP230@MLT.co.jp
Subject : Re : IFAX received
Date : Thu, 8 Aug 2002 12:10:00

(Message Body)
Massage-ID : <20020808115600.AA01886@ifax.MLT.co.jp>
FAX=
E-mail=IFAX110@ifax.MLT.co.jp
Please reply without deleting the above.
From : IFAX120@ifax.MLT.co.jp
Subject : 1234MLT Meeting Schedule

FIG.8

| F-CODE | DIVISION NUMBER |
|--------|-----------------|
| 1234   | 001             |
| 2345   | 002             |
| 1111   | 003             |

FIG.9

| DIVISION NUMBER | RECEIPT NOTIFICATION DESTINATION |
|---|---|
| 001 | IMD410@MLT.co.jp |
| 002 | IMD420@MLT.co.jp |
| 003 | IMD430@MLT.co.jp |

FIG.10

| Subject | DIVISION NUMBER |
|---------|-----------------|
| 1234    | 001             |
| 2345    | 002             |
| 1111    | 003             |

FIG.16

| DEVICE INFORMATION | LOCATION INFORMATION |
|---|---|
| IFAX110@ifax.MLT.co.jp | 41:18' 56" N  135:30' 25" E |
| 06-6100-1234 | 41:19' 57" N  136:31' 26" E |

FIG.20

(Header)
From : MFP530@MLT.co.jp
To : MFP230@MLT.co.jp
Massage-ID : <20020808121000.AA01886@MFP530.MLT.co.jp
            ‾‾‾‾‾‾‾‾‾‾‾‾‾‾ ‾‾‾‾‾‾‾ ‾‾‾‾‾‾‾‾‾‾‾‾‾‾‾‾‾
                (1)          (2)          (3)
>

(Message Body)
The following fax data is going to be sent.
From : MFP530@MLT.co.jp
Subject : 1234MLT Meeting schedule
FAX =
E-mail=

FIG.23

| FAX DATA DESTINATION | SEND NOTIFICATION DESTINATION |
|---|---|
| 06-6100-2345 | PC610@MLT.co.jp |
| 06-6101-3456 | MFP2230@MLT.co.jp |

FIG.27

(Header)
From : MFP230@MLT.co.jp
To : IMD410@MLT.co.jp
Reply-To : MFP530@MLT.co.jp
Massage—ID : <20020808121235.AA05567@MFP230.MLT.co.jp
>

(Message Body)
Massage—ID : <20020808121000.AA01886@MFP530.MLT.co.jp
>
FAX=
E-mail=
Please reply without deleting the above.
From : MFP530@MLT.co.jp
Subject : 1234MLT Meeting Schedule

FIG.31

(Header)
From : MFP230@MLT.co.jp
To : MFP530@MLT.co.jp
Massage-ID : <20020808121000.AA01893@MFP230.MLT.co.jp
>

(Message Body)
Register destination of send notification mail.
Original Destination of Fax Data : MFP230@MLT.co.jp
Unit Number : 2345
Destination of Send Notification Mail : IMD410@MLT.co.jp

FIG.32

| FAX DATA DESTINATION | DIVISION NUMBER | SEND NOTIFICATION DESTINATION |
|---|---|---|
| MFP230@MLT.co.jp | 1234 | IMD410@MLT.co.jp |
| 06-6101-3456 | 2345 | IMD420@MLT.co.jp |

FIG.34

(Header)
From : MFP530@MLT.co.jp
To : IMD410@MLT.co.jp
Massage-ID : <20020808121000.AA01886@MFP530.MLT.co.jp
>

(Message Body)
The following fax data is going to be sent.
From : MFP530@MLT.co.jp
Subject : 1234MLT Meeting schedule
FAX =
E-mail=

FAX DATA TRANSMISSION DEVICE AND FAX DATA TRANSMISSION SYSTEM

This application is based on an application No. 2002-282628 filed in Japan, the contents of which are hereby incorporated by reference.

BACKGROUND OF THE INVENTION

1. Field of the Invention

The present invention relates to a fax data transmission device and a fax data transmission system.

2. Related Art

A network fax (facsimile) device having the following fax forwarding capability is disclosed, for instance, by Unexamined Japanese Patent Application Publication No. 2000-295271. Suppose the user of the network fax device needs access to fax data while away on a business trip or the like from his or her office where the network fax device is located. In this case, the user sends a forwarding instruction to the network fax device, from a nearby fax device or telephone device. The network fax device receives the forwarding instruction, and forwards the fax data to a fax device which is located where the user is. This enables the user to print the fax data while away from the location of the network fax device.

This conventional network fax device is, however, in need of various improvements. For example, the user cannot immediately know that the fax data has been received by the network fax device, while away from the location of the network fax device. Also, a procedure of forwarding the fax data from the network fax device to the fax device located where the user is present is complex.

SUMMARY OF THE INVENTION

The present invention aims to provide a fax data transmission device and a fax data transmission system which enables the user to know receipt of fax data right away while away on a business trip or the like, and forwards the fax data to the user with a simple procedure.

The stated aim can be achieved by a fax data transmission device including: a first receiving unit operable to receive fax data; a storing unit operable to store the received fax data and an identifier for identifying the fax data, in correspondence with each other; a notifying unit operable to send receipt information to outside of the fax data transmission device, the receipt information including the identifier and a notification that the fax data identified by the identifier has been received; a second receiving unit operable to receive destination information for specifying a destination to which the fax data should be forwarded, as a reply to the receipt information; and a sending unit operable to send the fax data to the destination specified by the destination information.

According to this construction, the notification of the receipt of the fax data is sent to the user. This enables the user to know the receipt of the fax data right away. In reply to this notification, the user designates the destination to which the fax data should be forwarded. Thus, the forwarding destination of the fax data can be designated easily.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 4 shows example receipt notification mails;

FIG. 5 shows example reply mails;

FIG. 8 shows an example table that shows a correspondence relationship between F-codes and division numbers;

FIG. 9 shows an example table that shows a correspondence relationship between division numbers and notification destinations;

FIG. 10 shows an example table that shows a correspondence relationship between contents of Subject fields and division numbers;

FIG. 16 shows an example table holding location information;

FIG. 20 shows an example send notification mail;

FIG. 23 shows an example table that shows a correspondence relationship between fax data destinations and send notification mail destinations;

FIG. 27 shows an example forwarded mail;

FIG. 31 shows an example send notification destination register mail sent from a receiver MFP to the sender MFP in the third embodiment;

FIG. 32 shows an example of the storage contents of a send notification destination storing unit shown in FIG. 30;

FIG. 34 shows an example send notification mail in the third embodiment;

DESCRIPTION OF THE PREFERRED EMBODIMENTS

The following describes embodiments of a fax data transmission device and a fax data transmission system of the present invention, by referring to drawings.

First Embodiment (1) Construction of a Fax Data Transmission System

Figure 1:
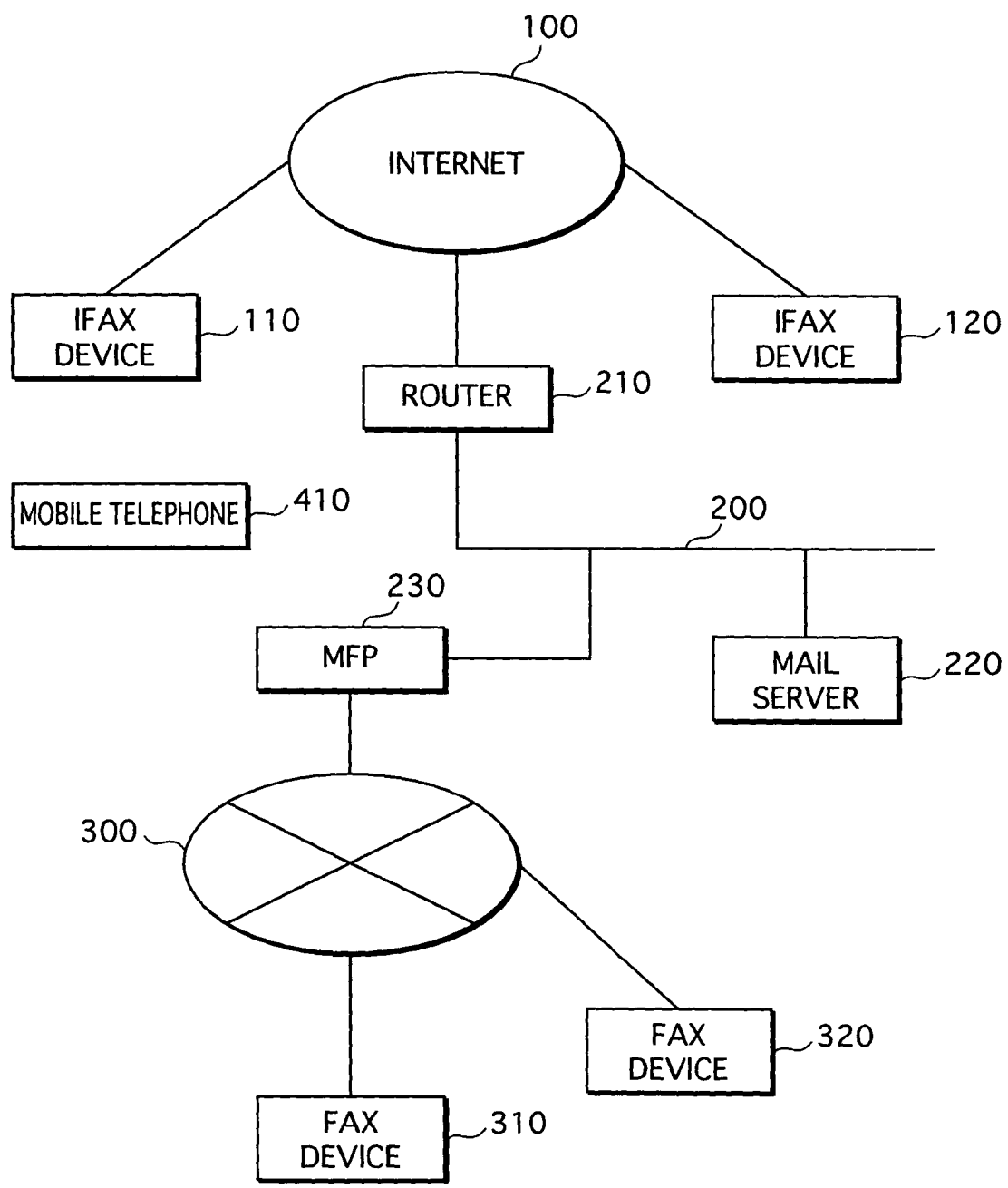
FIG. 1 shows an example construction of a fax data transmission system to which the first embodiment of the invention relates.

FIG. 1 shows an example construction of a fax data transmission system to which the first embodiment of the present invention relates. Internet fax (hereafter referred to as "ifax") devices 110 and 120 are connected to the Internet 100. A mail server 220 and a multi-functional image forming device (hereafter referred to as an "MFP" (multi-functional peripheral)) 230 are connected to a LAN 200 which is connected with the Internet 100 via a router 210. Fax devices 310 and 320 are connected to the MFP 230 via a public telephone line 300. Also, a mobile telephone 410 is provided as one example of a portable communication device. In this specification, "an ifax" denotes a document that is sent/received over the Internet, whereas "a fax" denotes a document that is sent/received over a public telephone line according to G standards such as G3 and G4. Meanwhile, data of an ifax and data of a fax are both referred to as "fax data", though they are of different data types due to different standards stipulated for an ifax and a fax.

Each of the ifax devices 110 and 120 is capable of sending/receiving an ifax. An ifax takes the form of image data that is attached to an Internet mail (see RFC 2305 and RFC 2532). Accordingly, the ifax device may be realized by installing application software on a general-purpose personal computer (PC). The ifax device may also be realized by an MFP which has an ifax send/receive function, or by other devices. RFC (Request For Comments) refers to document of technical proposals and comments published by IETF (Internet Engineering Task Force) that is an organization for promoting the technical development of the Internet.

Each of the fax devices 310 and 320 is capable of sending/receiving a fax via the public telephone line 300 according to a fax protocol such as G3 or G4. The fax device may be realized not only by a dedicated fax machine but also by an MFP which has a fax send/receive function. The fax device may also be realized by installing application software on a general-purpose PC.

In this embodiment, the user of the MFP 230 carries the mobile telephone 410. This being so, when the MFP 230 receives fax data of a fax or an ifax, the MFP 230 sends a notification of the receipt of the fax data to the mobile telephone 410 via an Internet mail. Having received the Internet mail, the user adds information relating to a destination to which the fax data should be forwarded, in a reply mail to the Internet mail. The user then sends the reply mail from the mobile telephone 410 to the MFP 230. The MFP 230 receives the reply mail, and forwards the fax data to the destination based on the reply mail.

Figure 2:
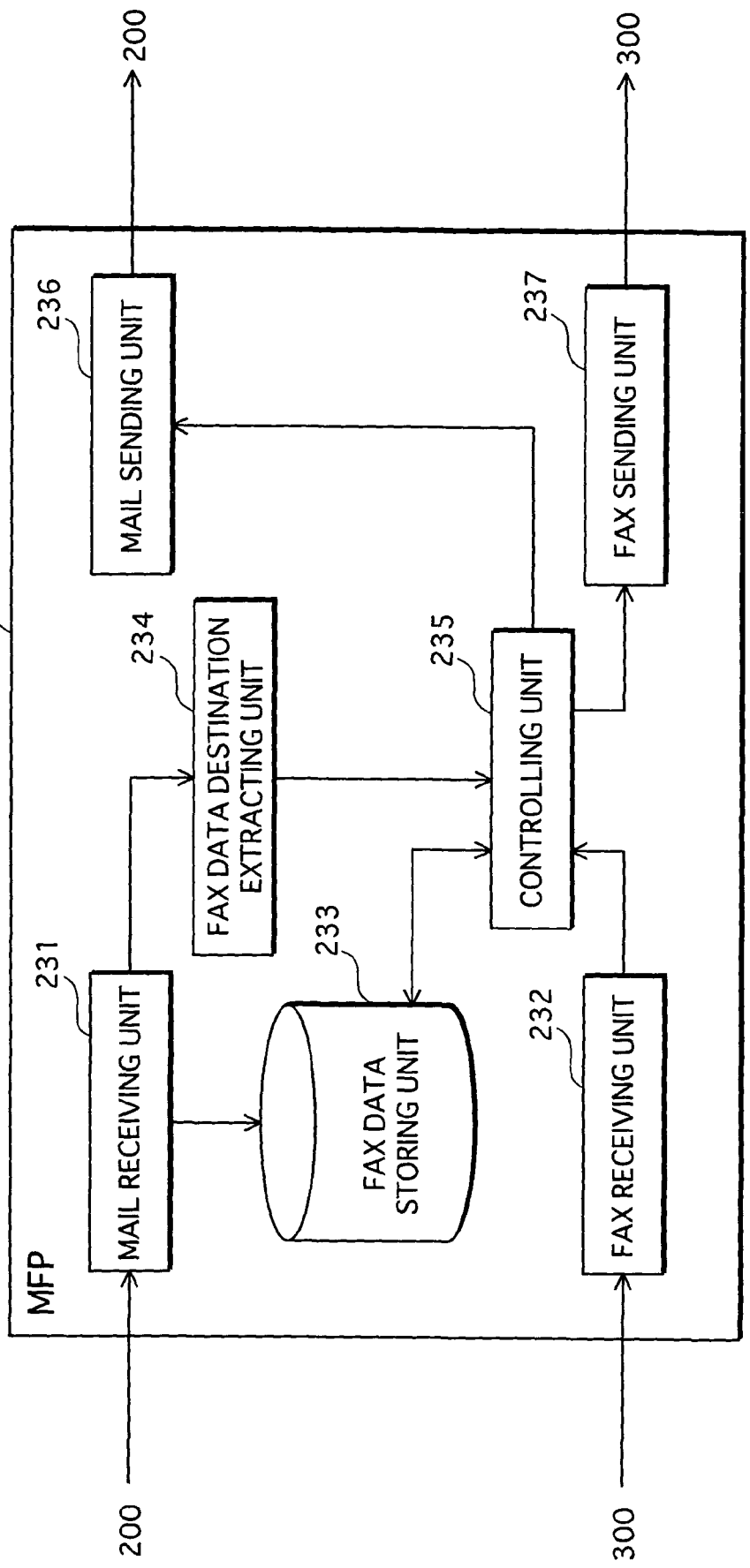
FIG. 2 is a functional block diagram showing a partial construction of an MFP shown in FIG. 1.

FIG. 2 is a functional block diagram of a partial construction of the MFP 230 that is a fax data transmission device in this embodiment. The MFP 230 combines the functions of a scanner, printer, copier, fax machine, and the like, although FIG. 2 only shows components which are relevant to the invention in simplified form while omitting other components.

In the drawing, the MFP 230 includes a mail receiving unit 231, a fax receiving unit 232, a fax data storing unit 233, a fax data destination extracting unit 234, a controlling unit 235, a mail sending unit 236, and a fax sending unit 237.

The mail receiving unit 231 receives an Internet mail (hereafter simply called a "mail") which is sent over the Internet 100 and stored in the mail server 220, through the LAN 200.

The fax receiving unit 232 receives fax data of a fax which is sent over the public telephone line 300 according to a fax protocol such as G3 or G4.

The fax data storing unit 233 stores fax data of a fax or an ifax and an identifier of the fax data, in correspondence with each other. In the case of an ifax, a "Message-ID" assigned to a mail for sending the ifax can be used as an identifier, as one example. In the case of a fax, an identifier may be arbitrarily assigned in the MFP 230, as one example.

The fax data destination extracting unit 234 extracts, if the mail receiving unit 231 receives a mail which contains information relating to a destination to which fax data should be forwarded, the information from the mail.

The controlling unit 235 exercises control on various operations such as sending fax data stored in the fax data storing unit 233, sending a mail, converting fax data of an ifax to fax data of a fax and vice versa, and assigning an identifier to fax data of a fax.

The mail sending unit 236 sends a mail (including a mail which carries fax data of an ifax).

The fax sending unit 237 sends fax data of a fax.

A fax data forwarding operation of this embodiment is described below, using an example where fax data of a fax is sent from the fax device 310 to the MFP 230.

When fax data of a fax is sent from the fax device 310 to the MFP 230, the MFP 230 sends a mail which notifies of the receipt of the fax data (such a mail is hereafter called a "receipt notification mail"), to the mobile telephone 410 via the mail sending unit 236. An operation of sending a receipt notification mail by the MFP 230 is explained in detail later.

Having received the receipt notification mail on the mobile telephone 410, the user adds information (e.g. a fax number, a mail address, etc.) relating to a destination to which the fax data should be forwarded, to the receipt notification mail. The user then returns the resulting mail to the MFP 230 as a reply mail. The MFP 230 receives the reply mail, and forwards the fax data to the destination designated in the reply mail.

According to this fax data transmission system, even when the user is away from the location of the MFP 230 on a business trip or the like, the user can obtain fax data through a simple operation of replying to a receipt notification mail via the mobile telephone 410.

As mentioned earlier, the MFP 230 can convert fax data of an ifax to fax data of a fax and vice versa (this is a well-known technique and so its detailed explanation has been omitted). Therefore, even if fax data of an ifax is received by the MFP 230 but there is only a fax device near the user, the MFP 230 can convert the fax data of the ifax to fax data of a fax and forward it to the fax device near the user. Likewise, even if fax data of a fax is received by the MFP 230 but there is only an ifax device near the user, the MFP 230 can convert the fax data of the fax to fax data of an ifax and forward it to the ifax device near the user.

Figure 3:
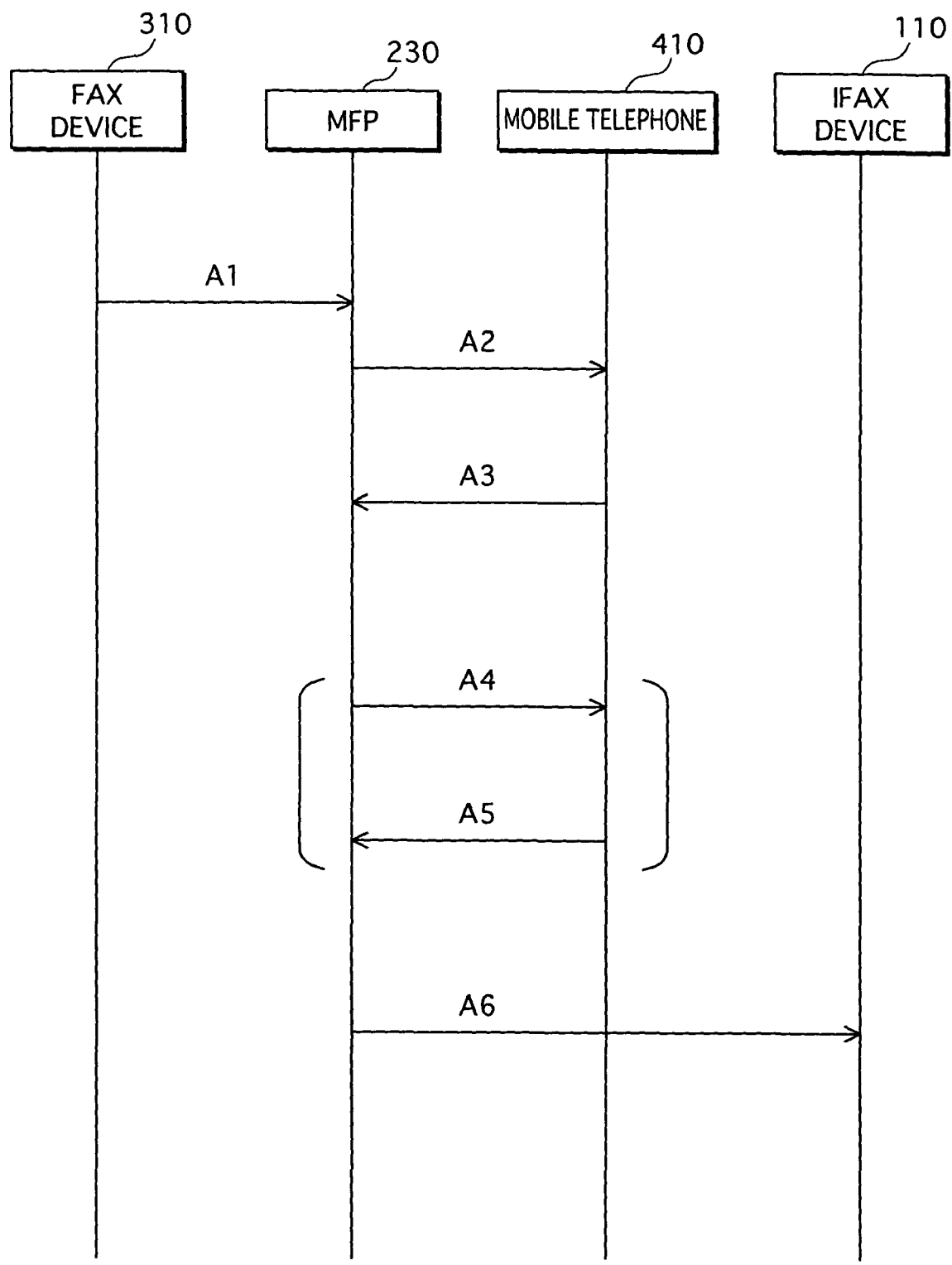
FIG. 3 is a sequence chart showing a fax data forwarding operation in the first embodiment.

FIG. 3 is a sequence chart of the fax data forwarding operation of this embodiment. The drawing concerns a case where the fax device 310 sends fax data of a fax to the MFP 230, the MFP 230 sends a receipt notification mail to the mobile telephone 410, the mobile telephone 410 replies to the MFP 230, and the MFP 230 forwards the fax data to the ifax device 110 based on the reply mail.

First, the fax device 310 sends fax data of a fax to the MFP 230 (A1). The MFP 230 receives the fax data, and specifies a destination of a receipt notification mail. An operation of specifying a destination of a receipt notification mail is explained in detail later. The MFP 230 then sends the receipt notification mail to a mail address of the mobile telephone 410 which is specified as the destination of the receipt notification mail, to notify of the receipt of the fax data (A2).

FIG. 4 shows example formats and contents of receipt notification mails. FIG. 4A shows a receipt notification mail when fax data of a fax is received, whereas FIG. 4B shows a receipt notification mail when fax data of an ifax is received.

As shown in each of these drawings, the message body of the receipt notification mail includes an identifier of the received fax data ("Message-ID"). In the case of an ifax, the header of a mail for sending the ifax includes a "Message-ID" field. Accordingly, the contents of this "Message-ID" field can be used as an identifier (see FIG. 4B). Alternatively, the MFP 230 may generate a unique identifier and assign it to the ifax using any of various methods.

In the case of a fax, the MFP 230 may arbitrarily generate an identifier and assign it to the fax (see FIG. 4A). Alternatively, a unique identifier may be assigned to the fax based on, for example, a fax number of a sender and a sending date and time.

Thus, an identifier of fax data can be set either by the MFP 230 (the fax data transmission device of this embodiment) or by a sender of the fax data.

The reason that the "Message-ID" is included not in the header but in the message body of the receipt notification mail is given below. Suppose the "Message-ID" field is included in the header of the receipt notification mail. This being so, when the mobile telephone 410 replies to the receipt notification mail, the contents of the "Message-ID" field in the header of the receipt notification mail might not be included in the reply mail.

Various information can be added to the message body of the receipt notification mail to help the user understand the contents of the fax data. In FIG. 4A, for instance, a fax number and ID of a sender (the fax device 310) are included in the message body. In FIG. 4B, for instance, a mail address of a sender (the ifax device 120) and the contents of a "Subject" field are included in the message body. Other information can equally be added in the message body. In FIGS. 4A and 4B, an instruction "Please reply without deleting the above." is included in the message body to warn the user not to delete the "Message-ID" or the area for entering information relating to a fax data destination ("FAX=" and "E-mail="), though such an instruction may be omitted.

Referring back to FIG. 3, the mobile telephone 410 receives the receipt notification mail. If the fax data should be forwarded to a fax device, the user enters a fax number of the fax device after "FAX=" in the message body of the receipt notification mail. If the fax data should be forwarded to an ifax device, the user enters a mail address of the ifax device after "E-mail=" in the message body of the receipt notification mail. Having done so, the user returns it to the MFP 230 (A3).

FIG. 5 shows example formats and contents of reply mails. FIG. 5A shows a reply mail when the fax data is fax data of a fax, whereas FIG. 5B shows a reply mail when the fax data is fax data of an ifax. Though the area for entering information relating to a fax data destination is expressed as "FAX=" and "E-mail=" to facilitate understanding of the user in these drawings, the invention is not limited to such. For instance, such an area may simply be expressed as "Destination=", after which the user enters either a fax number of a mail address.

In the present example, the ifax device 110 is located near the user. Accordingly, the user enters a mail address of the ifax device 110 after "E-mail=" in the message body of the receipt notification mail, and returns it to the MFP 230 as a reply mail. The MFP 230 receives the reply mail, and extracts the mail address of the ifax device 110 from the reply mail as information relating to a destination to which the fax data should be forwarded. The MFP 230 converts the fax data of the fax received from the fax device 310 to fax data of an ifax, and forwards it to the ifax device 110 (A6). Here, suppose the reply mail does not contain information relating to a destination to which the fax data should be forwarded. In such a case, the MFP 230 resends the receipt notification mail to the mobile telephone 410 (A4), and the mobile telephone 410 resends the reply mail to the MFP 230 (A5). A4 and A5 may be repeated until the MFP 230 recognizes a destination. Alternatively, A4 and A5 may be omitted so that the fax data forwarding operation terminates if the reply mail does not contain information relating to a destination.

If the mobile telephone 410 has a GPS (Global Positioning System) function, the user may add location information in the reply mail. In this case, the MFP 230 specifies a destination to which the fax data should be forwarded, based on the location information. This operation is explained in detail later.

Specific processing of the MFP 230 to realize the above fax data forwarding operation is explained below.

Figure 6:
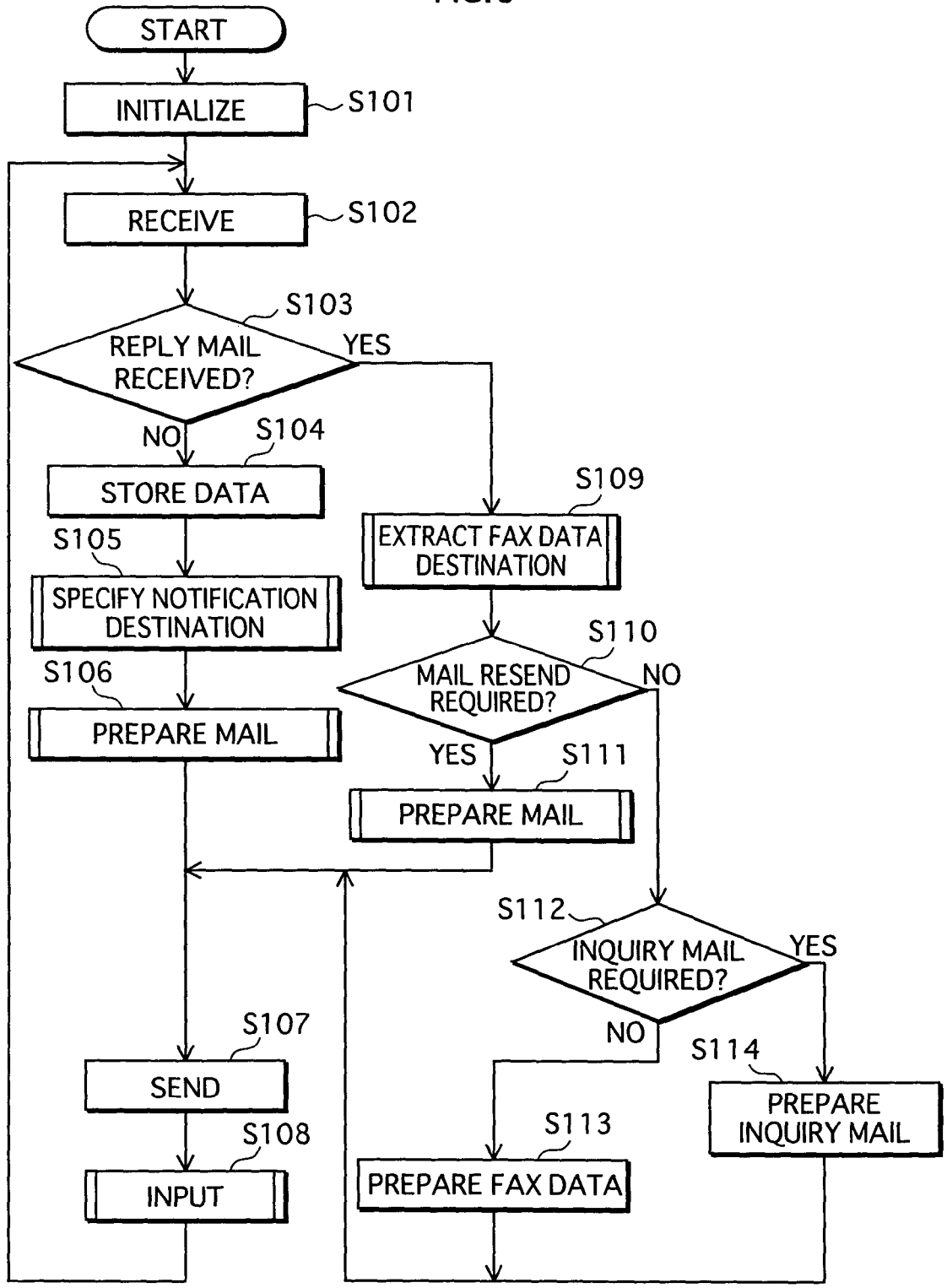
FIG. 6 is a flowchart showing processing performed by the MFP in the first embodiment.

FIG. 6 is a flowchart of processing of the MFP 230. This processing is achieved by the controlling unit 235 in the MFP 230. The controlling unit 235 can be realized by a CPU, a memory, and the like, or by dedicated hardware, which operate according to a program.

Upon activation, the MFP 230 performs an initialization process which includes initialization of storage areas such as the memory and initialization of the CPU (S101). The MFP 230 then performs a reception process (S102). In the reception process, the MFP 230 receives fax data of a fax via the public telephone line 300, or receives a mail (including a mail which carries fax data of an ifax) via the mail server 220. A method of receiving a fax and a method of receiving a mail from the mail server 220 are well known and so their detailed explanation has been omitted here.

The MFP 230 judges whether a reply mail to a receipt notification mail has been received (e.g. from the mobile telephone 410) in the reception process of step S102 (S103). If a reply mail has not been received (S103: NO), i.e., if fax data of a fax or a mail containing fax data of an ifax has been received, the processing advances to step S104.

When fax data of a fax or an ifax has been received in the reception process of step S102, the MFP 230 stores the fax data and its identifier ("Message-ID") in correspondence with each other in a storage area such as a hard disk (S104). The MFP 230 then specifies a destination of a receipt notification mail for notifying of the receipt of the fax data (S105).

Figure 7:
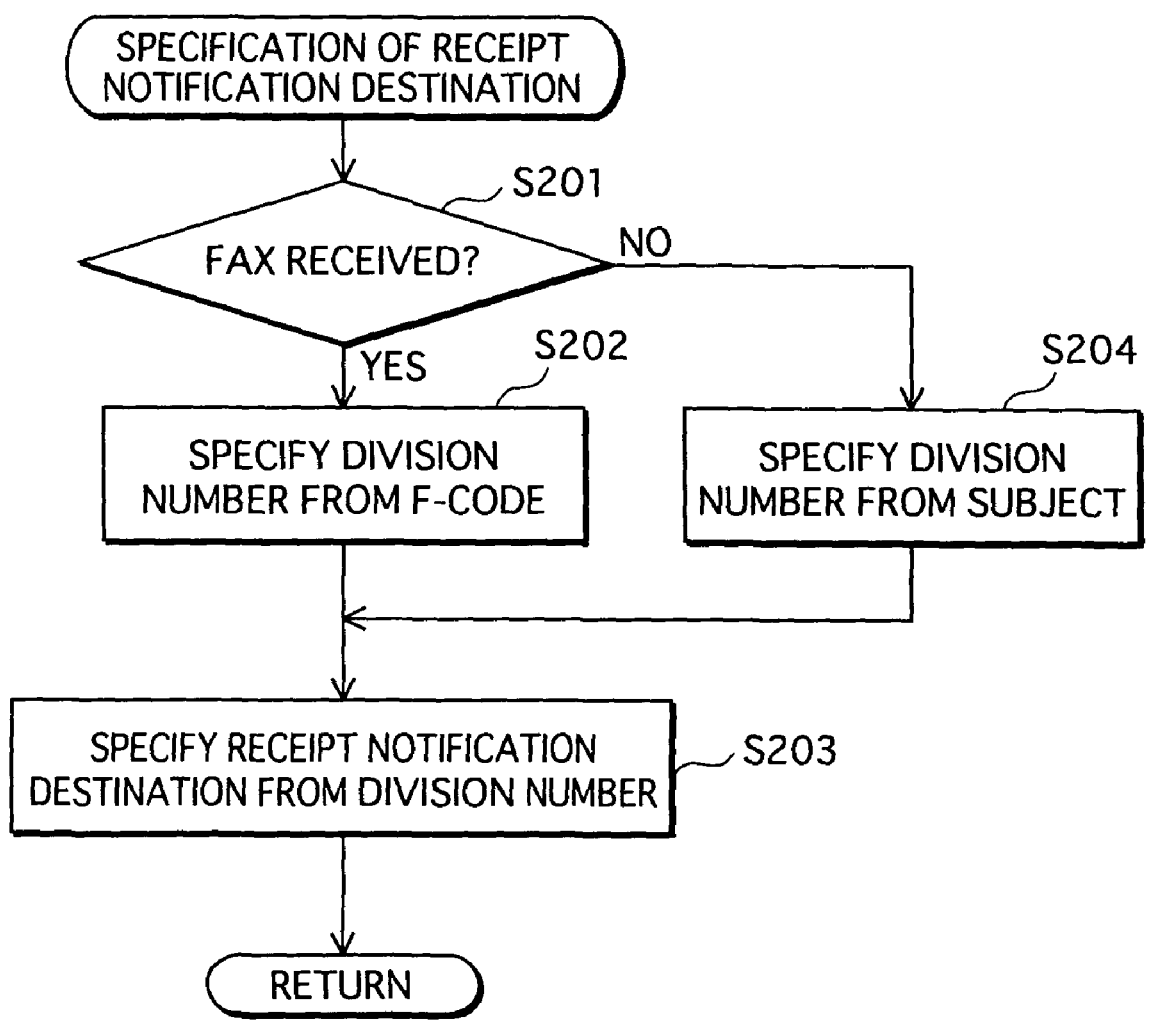
FIG. 7 is a flowchart showing a process of specifying a notification destination in FIG. 6.

FIG. 7 is a flowchart of the process of specifying the destination of the receipt notification mail in step S105.

In FIG. 7, the MFP 230 judges whether the received fax data is fax data of a fax or fax data of an ifax (S201). If the received fax data is fax data of a fax (S201: YES), the MFP 230 specifies a division number using F-Code (included in the fax data) that is defined by an international standard (ITU-T). To specify the division number, the MFP 230 holds a table showing a correspondence relationship between F-Codes and division numbers. FIG. 8 shows an example of such a table. When there are many users, one F-Code may be assigned to each individual user or to each group of users. When there is only one user as in the case of a single-person office or the like, one F-Code may be assigned to that user. In the latter case, it is also possible to omit the F-Code and instead assign one division number.

Once the division number has been specified, the MFP 230 specifies the destination of the receipt notification mail from the division number (S203). To do so, the MFP 230 holds a table that shows a correspondence relationship between division numbers and receipt notification mail destinations. FIG. 9 shows an example of such a table. In the drawing, the division numbers shown in FIG. 8 are associated with mail addresses of receipt notification mail destinations. The MFP 230 specifies the destination of the receipt notification mail based on this table.

If the received fax data is fax data of an ifax (S201: NO), on the other hand, the MFP 230 specifies a division number from the contents of the "Subject" field in a mail which carries the fax data of the ifax (S204). To do so, the MFP 230 holds a table showing a correspondence relationship between the contents of the "Subject" field and division numbers. FIG. 10 shows an example of such a table. Here, the first four digits of the "Subject" field are used. Once the division number has been specified, the MFP 230 specifies the destination of the receipt notification mail with reference to the table shown in FIG. 9, in the same way as when fax data of a fax is received (S203). If F-Codes and the contents of the "Subject" field are the same as in the case of the tables shown in FIGS. 8 and 10, these tables may be realized by a single table.

Referring back to FIG. 6, after the destination of the receipt notification mail is specified (S105), the processing advances to a mail preparation process (S106).

Figure 11:
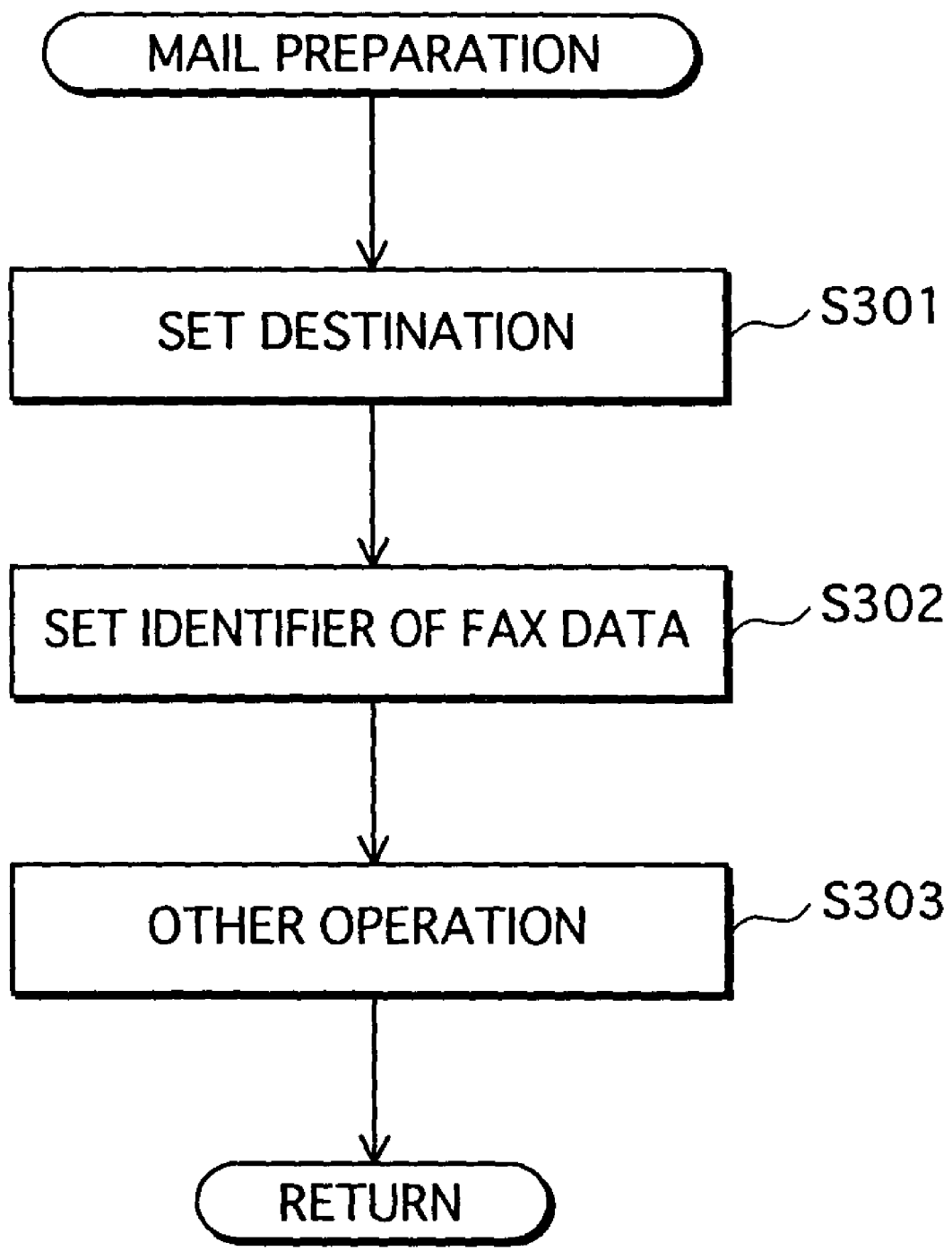
FIG. 11 is a flowchart showing a mail preparation process in FIG. 6.

FIG. 11 is a flowchart of the mail preparation process in step S106.

In FIG. 11, the MFP 230 sets the destination specified in step S105, in the header of the receipt notification mail (S301). The MFP 230 also sets the identifier of the fax data ("Message-ID"), in the message body of the receipt notification mail (S302). The MFP 230 further performs other operations (S303), to complete the mail preparation process.

The other operations mentioned here include an operation of setting additional information in the receipt notification mail. For example, when the received fax data is fax data of a fax, a fax number and ID of the sender of the fax data are added in the message body of the receipt notification mail (see FIG. 3A). When the received fax data is fax data of an ifax, a mail address of the sender of the fax data and the contents of the "Subject" field are added in the message body of the receipt notification mail (see FIG. 3B).

Referring back to FIG. 6, after the receipt notification mail is prepared (S106), the MFP 230 sends the receipt notification mail (e.g. to the mobile telephone 410) (S107). The MFP 230 then performs an input process (S108). The input process referred to here is a process of receiving an input made by an operator via an operation panel that is mounted on the MFP 230.

Figure 12:
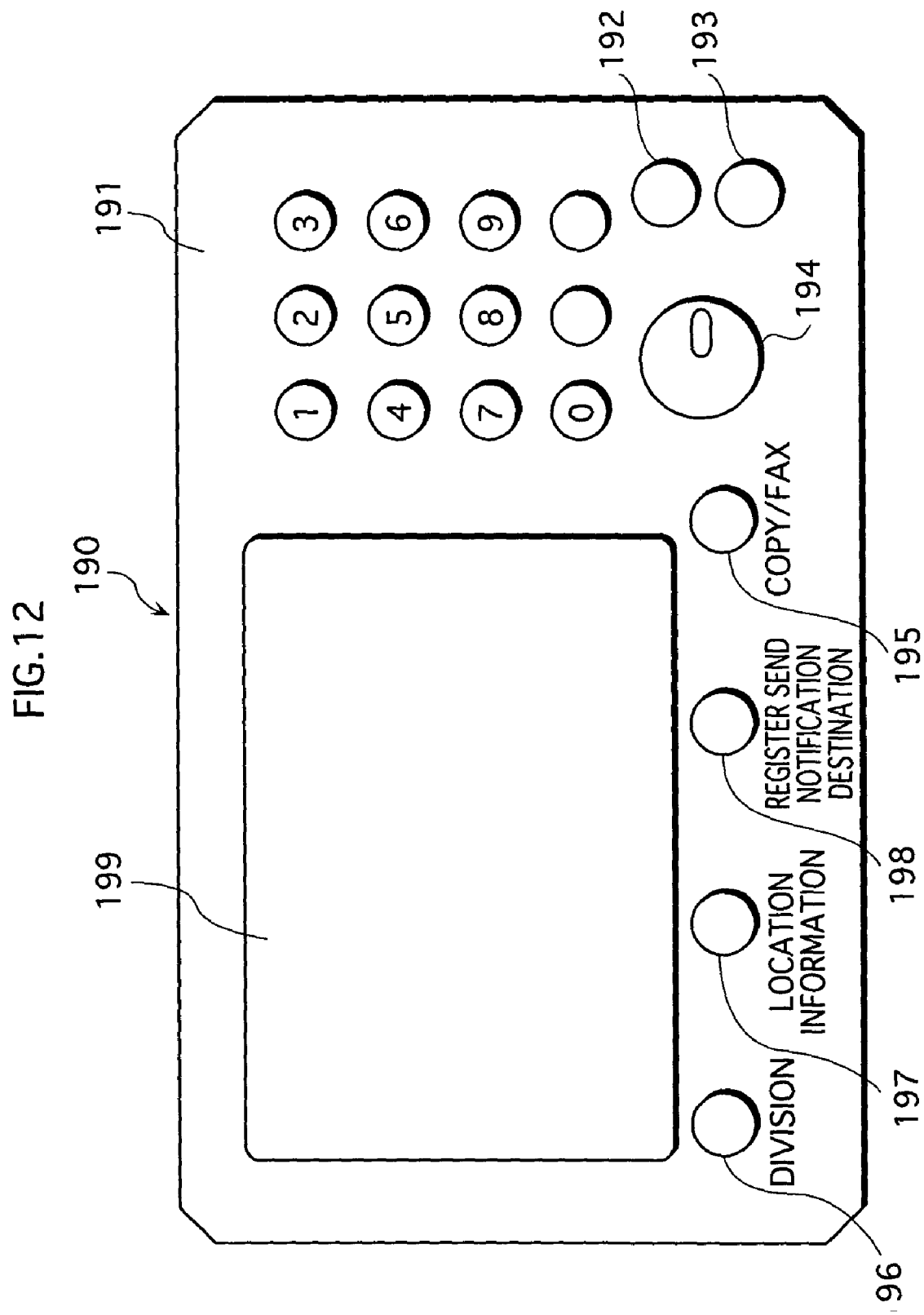
FIG. 12 shows an example appearance of an operation panel.

FIG. 12 shows an appearance of an operation panel 190 as an example operation panel. The operation panel 190 is mounted on the MFP 230 so as to be easy to view by the operator. The operator can input information such as a copy quantity and a fax number through this operation panel 190.

The operation panel 190 includes a numeric keypad 191, a stop key 192, a reset key 193, a start key 194, a copy/fax selection key 195, a division key 196, a location information key 197, a send notification destination register key 198, and a liquid crystal touch panel 199, as shown in FIG. 12.

The stop key 192 is a key for stopping an operation of the MFP 230. The reset key 193 is a key for initializing a display of the liquid crystal touch panel 199 which includes an entry such as a copy quantity. The start key 194 is a key for starting an operation such as reading a document.

The copy/fax selection key 195 is a key for selecting a copy mode or a fax mode. The contents of display on the liquid crystal touch panel 199 change depending on this selection. The division key 196 is a key for inputting a correspondence between a division number and an F-Code, the contents of the "Subject" field, or a destination.

The location information key 197 is a key for pre-registering information which is to be referenced when a reply mail from the mobile telephone 410 or the like contains location information. Examples of the pre-registered information include information about fax devices which can be used as destinations of fax data and locations of these fax devices. The send notification destination register key 198 is not used in this embodiment but used in the following embodiments, and so its explanation is given later. The liquid crystal touch panel 199 displays different screens according to the different modes. In the copy mode, the liquid crystal touch panel 199 displays a screen for inputting a copy quantity, a paper size, an image density, and the like. In the fax mode, the liquid crystal touch panel 199 displays a screen for selecting a destination of fax data and the like. This construction of the operation panel 190 may be modified such that the division key 196, the location information key 197, and the send notification destination register key 198 are displayed on the liquid crystal touch panel 199.

Figure 13:
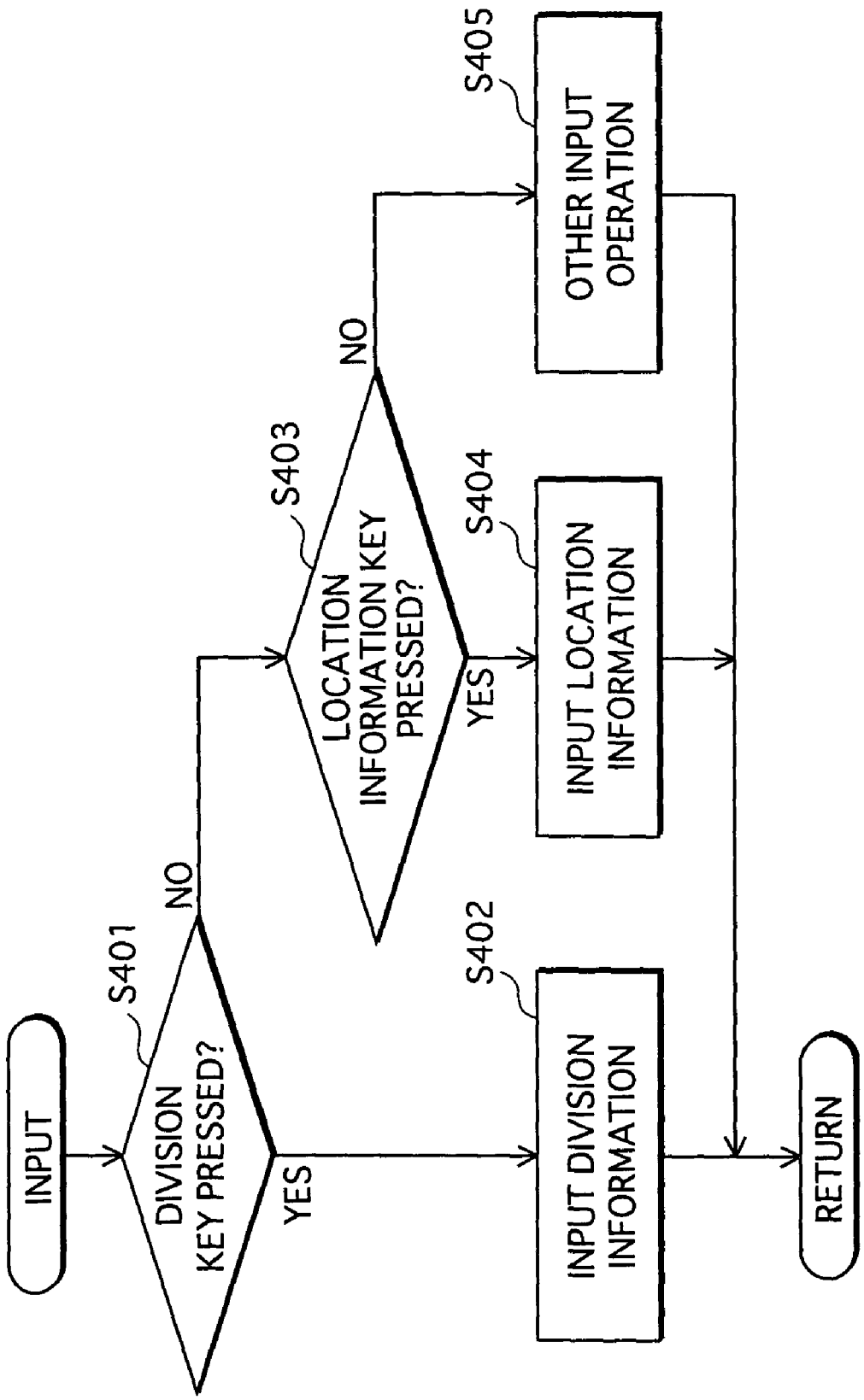
FIG. 13 is a flowchart showing an input process in FIG. 6.
Figure 14:
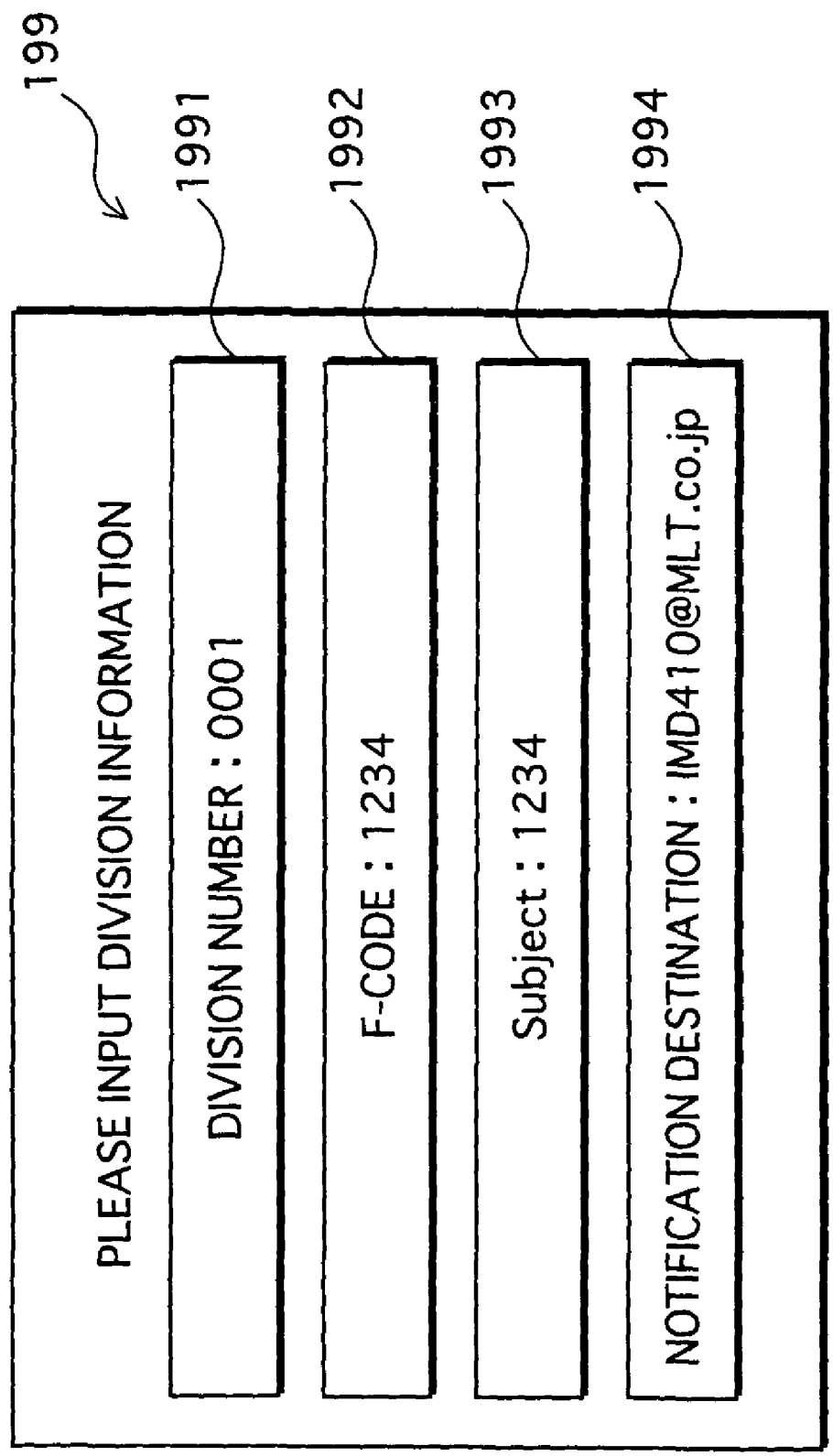
FIG. 14 shows an example screen displayed on a liquid crystal touch panel shown in FIG. 12, when inputting division information.

In the input process of step S108, the MFP 230 receives an input when the division key 196 or the location information key 197 is pressed. FIG. 13 is a flowchart of the input process in step S108. The MFP 230 judges whether the division key 196 is pressed (S401). If the division key 196 is pressed (S401: YES), the MFP 230 receives an input of division information (S402). For example, a screen such as the one shown in FIG. 14 is displayed on the liquid crystal touch panel 199. This screen includes a division number field 1991, an F-Code field 1992, a Subject field 1993, and a notification destination field 1994. Necessary information can be input on this screen using the numeric keypad 191, a software keyboard (not illustrated), or the like. The input information is stored in any of the tables shown in FIGS. 8 to 10.

Figure 15:
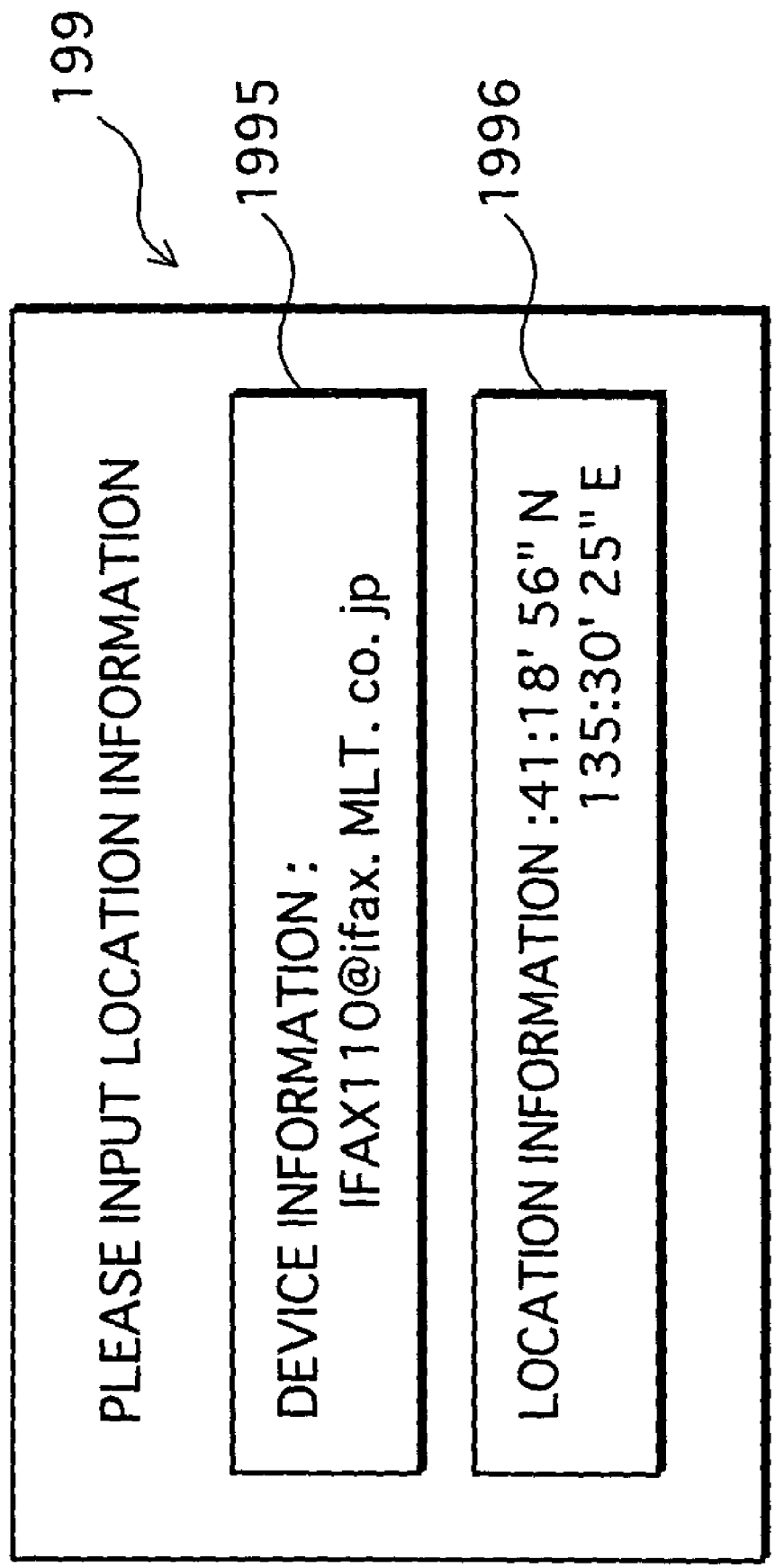
FIG. 15 shows an example screen displayed on the liquid crystal touch panel, when inputting location information.

If the division key 196 is not pressed (S401: NO), the MFP 230 judges whether the location information key 197 is pressed (S403). If the location information key 197 is pressed (S403: YES), the MFP 230 receives an input of location information (S404). For example, a screen such as the one shown in FIG. 15 is displayed on the liquid crystal touch panel 199. This screen includes a device information field 1995 and a location information field 1996. A fax number or a mail address is input in the device information field 1995, and location information is input in the location information field 1996. The input information is stored in a table such as that shown in FIG. 16. This being so, if the MFP 230 receives a reply mail which includes location information of the mobile telephone 410, the MFP 230 references this table to find an appropriate destination of fax data.

If the location information key 197 is not pressed (S403: NO), the MFP 230 performs other input operations (S405). The other input operations referred to here correspond to when a key other than the division key 196 and the location information key 197 is pressed (such as the numeric keypad 191), and so their explanation has been omitted here.

Referring back to FIG. 6, after the input process (S108), the MFP 230 returns to step S102. The MFP 230 then judges whether a reply mail to a receipt notification mail has been received (e.g. from the mobile telephone 410) in the reception process of step S102 (S103) If a reply mail has been received (S103: YES), the processing advances to step S109. So long as the reply mail is correct, information relating to a destination to which fax data should be forwarded (such as a fax number, a mail address, or location information) must be included in the message body of the reply mail. Accordingly, the MFP 230 extracts this information from the reply mail (S109).

Figure 17:
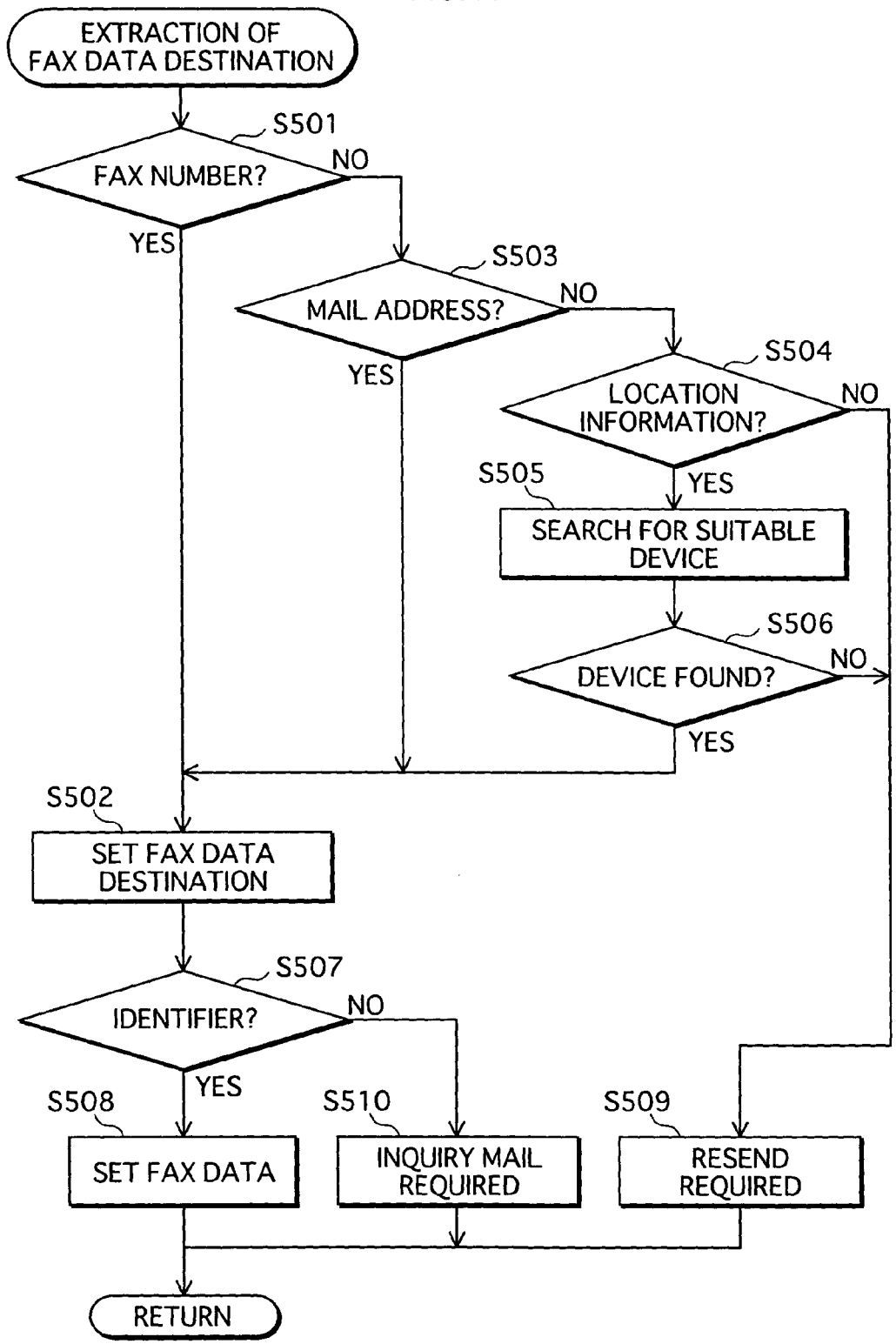
FIG. 17 is a flowchart showing a process of extracting a fax data destination in FIG. 6.

FIG. 17 is a flowchart of the process of extracting the information relating to the fax data destination in step S109. The MFP 230 judges whether a fax number is written after "FAX=" in the message body of the reply mail (S501). If a fax number is written after "FAX=" (S501: YES), fax data should be forwarded to a fax device of that fax number. Accordingly, the MFP 230 sets the fax number as the fax data destination (S502). If no fax number is written after "FAX=" (S501: NO), the MFP 230 judges whether a mail address is written after "E-mail=" in the message body of the reply mail (S503). If a mail address is written after "E-mail=" (S503: YES), fax data should be forwarded to an ifax device of the mail address. Accordingly, the MFP 230 sets the mail address as the fax data destination (S502). Suppose the reply mail only has the "Destination=" area instead of the "FAX=" area and the "E-mail=" area. In this case, if data entered after "Destination=" is made up of only numbers, the MFP 230 recognizes it as a fax number. If data entered after "Destination=" has a format "alphanumeric characters+an at mark (@)+alphanumeric characters", the MFP 230 recognizes it as a mail address.

If no mail address is written after "E-mail=" (S503: NO), the MFP 230 judges whether location information is included in the message body of the reply mail (S504). As mentioned above, if the mobile telephone 410 has a GPS function, the user can acquire location information of the mobile telephone 410 and add it to the reply mail. This being so, the MFP 230 judges whether location information is included in the message body of the reply mail.

If location information is included (S504: YES), the MFP 230 searches a table such as that shown in FIG. 16 for a device suitable as the fax data destination (S505). This can be done, for example, by comparing the location information in the reply mail with location information in the table. Though location information can be expressed in various formats, conversion between formats is relatively easy. Therefore, location information need not be limited to one format. If a suitable device (any of a fax device, an ifax device, an MFP, and the like) is found (S506: YES), the MFP 230 sets a fax number or a mail address of that device as the fax data destination (S502). A suitable device referred to here is a device that is registered in the table and is located within a predetermined short distance from the user (the mobile telephone 410). When two or more devices in the table are within the predetermined short distance from the user, a device that is closest to the user is selected.

After the fax data destination is set (S502) the MFP 230 judges whether a fax data identifier is included in the reply mail (S507). If a fax data identifier is included (S507: YES), the MFP 230 sets fax data identified by the fax data identifier as fax data that should be forwarded (S508). If no fax data identifier is included (S507: NO), the MFP 230 judges that an inquiry mail needs to be sent (S510). The inquiry mail is explained in detail later. If location information is not included in the reply mail (S504: NO) or if location information is included in the reply mail but a suitable device is not found in the table (S506: NO), the MFP 230 judges that the receipt notification mail including a message to this effect needs to be resent (S509) (corresponding to A4 in FIG. 3).

Referring back to FIG. 6, after the fax data destination extraction process (S109), the MFP 230 judges whether the receipt notification mail is required to be resent in step S509 (S110). If so (S110: YES), the MFP 230 prepares the receipt notification mail (S111). This process is fundamentally the same as step S106, and so its explanation is omitted here. If the receipt notification mail is not required to be resent in step S509 (S110: NO), the MFP 230 judges whether the inquiry mail is required to be send in step S510 (S112). If not (S112: NO), the MFP 230 prepares the fax data (S113). Here, depending on whether the destination of the fax data is a fax number or a mail address, the MFP 230 may need to convert the fax data into an appropriate format. This conversion is a well-known technique and so its detailed explanation has been omitted here. If the inquiry mail is required to be sent in step S510 (S112: YES), the MFP 230 prepares the inquiry mail (S114). In detail, a message such as "The document to be forwarded cannot be identified. Please reply again to the receipt notification mail you have received earlier." is generated so as to inquire of the user about which fax data should be forwarded.

After step S111, S113, or S114, the MFP 230 advances to step S107 to resend the receipt notification mail, forward the fax data, or send the inquiry mail. Following this, the MFP 230 performs the input process (S108). The send process and the input process have been explained earlier and so their explanation is omitted here.

According to the fax data transmission system of this embodiment, the user can be promptly notified of receipt of fax data by a receipt notification mail while away on a business trip or the like. Also, the user can have the fax data forwarded to a nearby device by a simple operation of replying to the receipt notification mail. Here, if a GPS function is available, the user can have the fax data forwarded to a nearby device according to location information just by returning the receipt notification mail (e.g. by pressing a predetermined key), with there being no need to input information about a destination to which the fax data should be forwarded. This is particularly effective when the user frequently visits the same place on business. For instance, if the user frequently visits the same company, branch, or factory on business, by pre-registering a device (a fax device, an ifax device, an MFP, and the like) located in such a business trip destination in the MFP 230, the user can have the fax data forwarded to that device easily.

Second Embodiment

In the first embodiment, a sender of fax data sends the fax data to an MFP, and the MFP forwards the fax data to a destination. In the second embodiment, a sender of fax data sends a mail which notifies that the fax data is going to be sent, to an MFP. If the user of the MFP is away on a business trip or the like, the MFP notifies the user that the fax data is going to be sent. The user responsively designates a destination to which the fax data should be sent. Lastly the sender sends the fax data to that destination.

Figure 18:
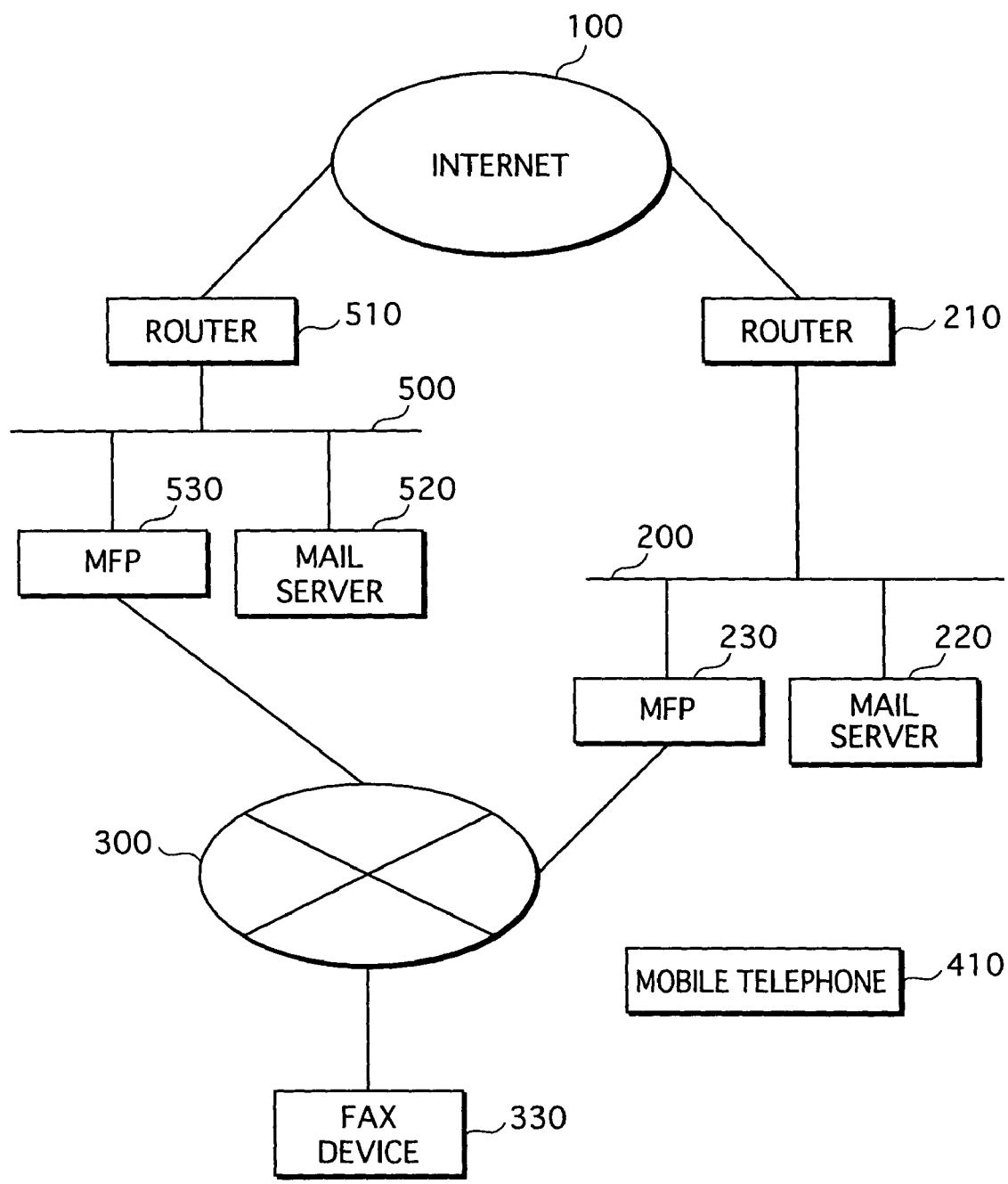
FIG. 18 shows an example construction of a fax data transmission system to which the second embodiment of the invention relates.

FIG. 18 shows an example construction of a fax data transmission system to which this embodiment relates. In the drawing, the mail server 220 and the MFP 230 are connected to the LAN 200 that is connected with the Internet 100 via the router 210, as in the first embodiment. Also, a mail server 520 and an MFP 530 are connected to a LAN 500 that is connected with the Internet 100 via a router 510. In addition, a fax device 330 is connected to the MFP 230 and the MFP 530 via the public telephone line 300. The mobile telephone 410 is provided as an example portable communication device, as in the first embodiment. A specific construction of the MFP 530 is the same as that of the MFP 230 shown in FIG. 2.

Figure 19:
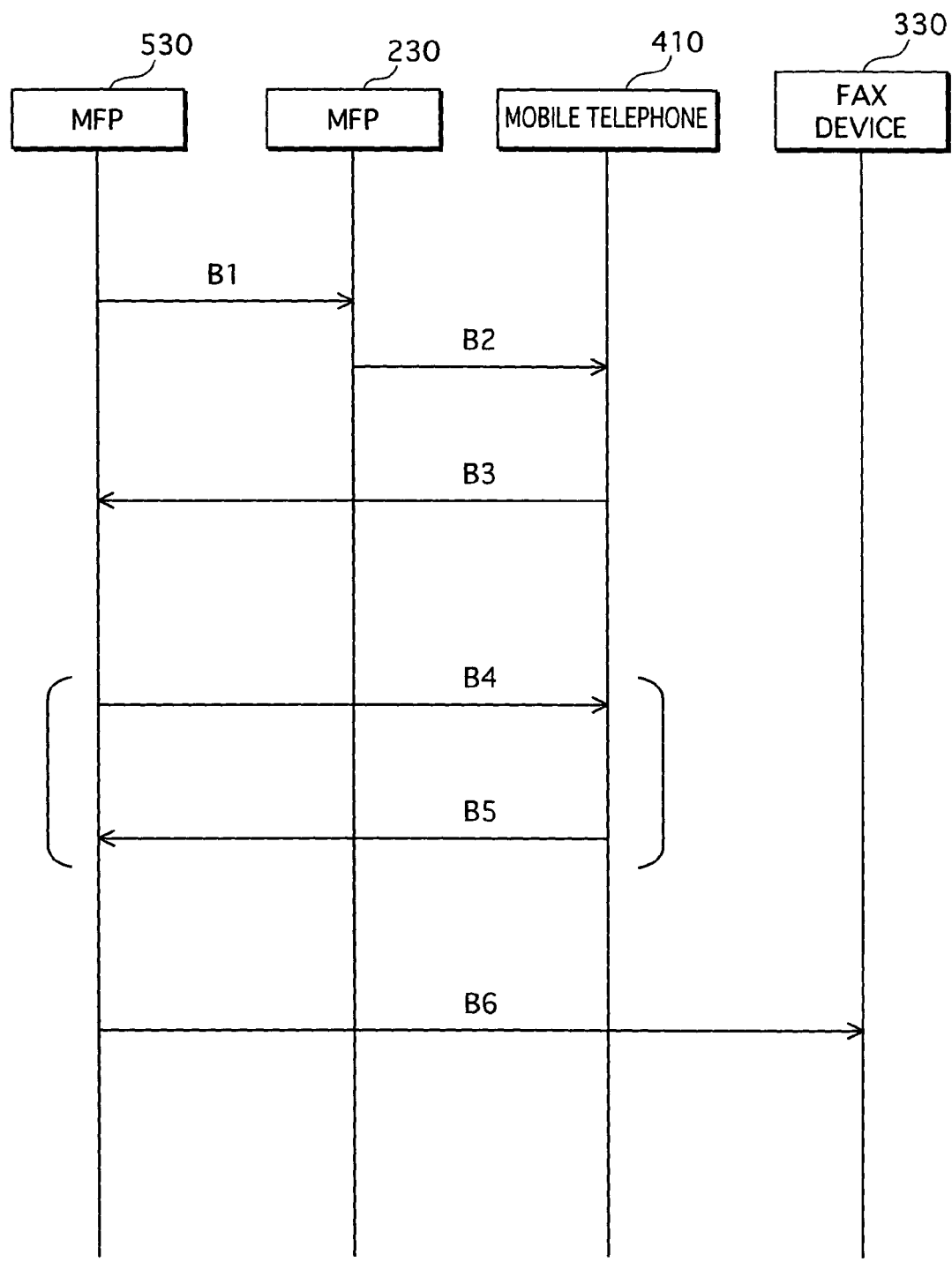
FIG. 19 is a sequence chart showing a fax data transmission operation in the second embodiment.

FIG. 19 is a sequence chart of a fax data transmission operation of this embodiment. In this embodiment, a sender of fax data sends a mail for notifying that the fax data is going to be sent (such a mail is hereafter called a "send notification mail"). To do so, the sender needs to have a mail transmission function. In the example shown in FIG. 19, the sender is the MFP 530 which has a mail transmission function. The MFP 530 sends a send notification mail to the MFP 230 (B1).

FIG. 20 shows an example send notification mail. As illustrated, the header of the send notification mail includes a "Message-ID" field. In the Message-ID, (1) corresponds to a date, (2) corresponds to a time, and (3) corresponds to a serial number. The serial number is increased by 1 for each mail. This Message-ID enables the sender to uniquely identify each mail. Note here that the format of the Message-ID is not limited to the above, so long as each mail can be uniquely identified.

Referring back to FIG. 19, the MFP 230 receives the send notification mail from the MFP 530. Although not shown in the drawing, if the fax data need not be sent to another place, the MFP 230 enters a fax number or mail address of the MFP 230 itself as the destination of the fax data in the send notification mail and returns it to the MFP 530 as a reply mail. The MFP 530 receives the reply mail, and sends the fax data to the MFP 230.

If the fax data need be sent to another place as the user of the MFP 230 is away on a business trip or the like, the MFP 230 processes the send notification mail received from the MFP 530, and forwards it to the mobile telephone 410 (B2). The user enters information relating to the fax device 330 as a destination to which the fax data should be sent in the forwarded send notification mail, in the same way as in the first embodiment. Having done so, the user sends the resulting mail from the mobile telephone 410 to the MFP 530 (B3) The MFP 530 receives the mail from the mobile telephone 410, and sends the fax data to the fax device 330 (B6). Here, if the mail sent from the mobile telephone 410 to the MFP 530 does not contain any information about a destination of the fax data, the MFP 530 may send the send notification mail to the mobile telephone 410 (B4 and B5), as in the first embodiment. Also, the mobile telephone 410 may use location information as in the first embodiment.

Figure 21:
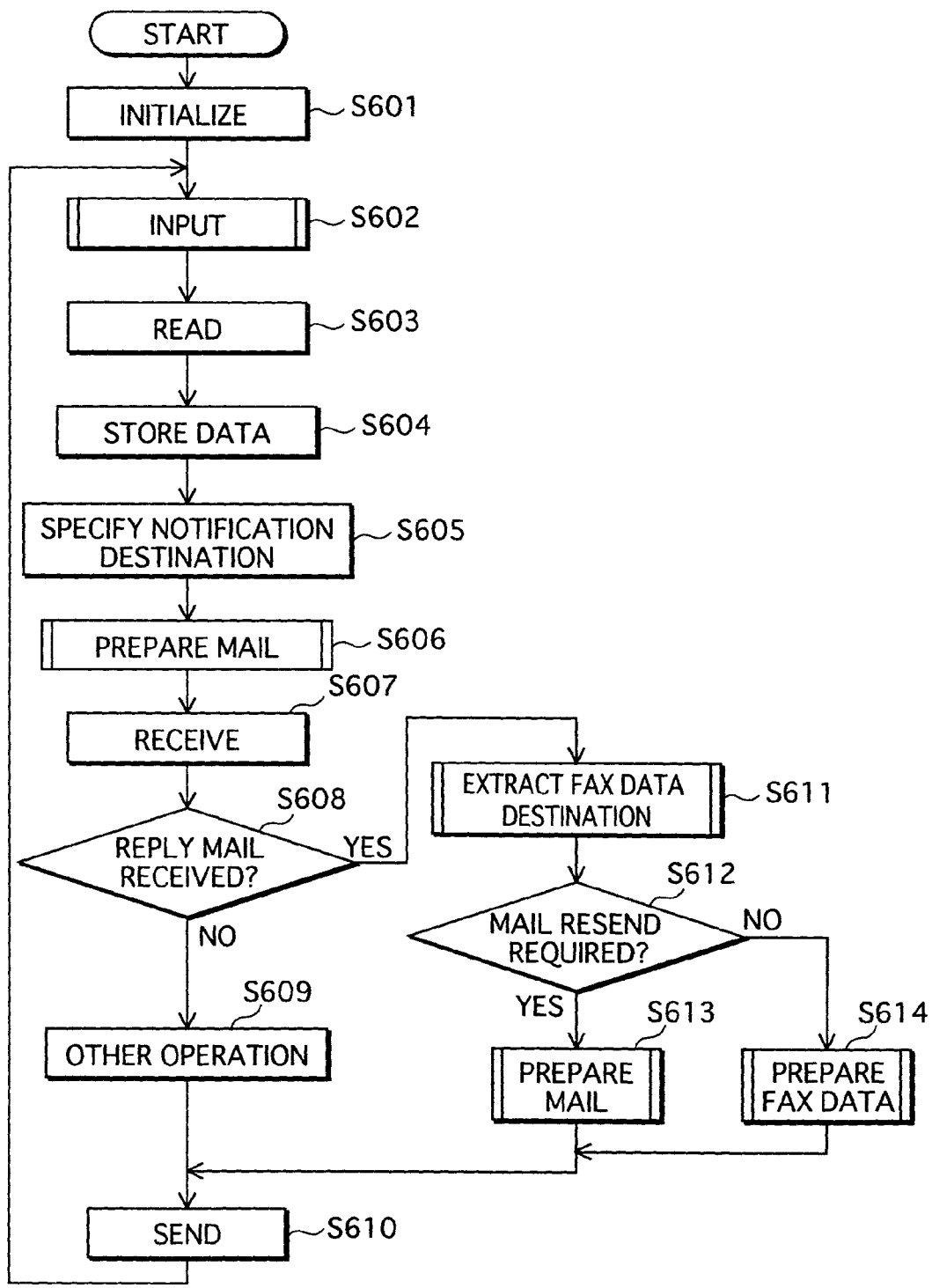
FIG. 21 is a flowchart showing processing performed by a sender MFP in the second embodiment.

FIG. 21 is a flowchart showing processing of the MFP 530 in this embodiment. First, the MFP 530 performs an initialization process in the same way as in the first embodiment (S601). The MFP 530 then performs an input process (S602).

Figure 22:
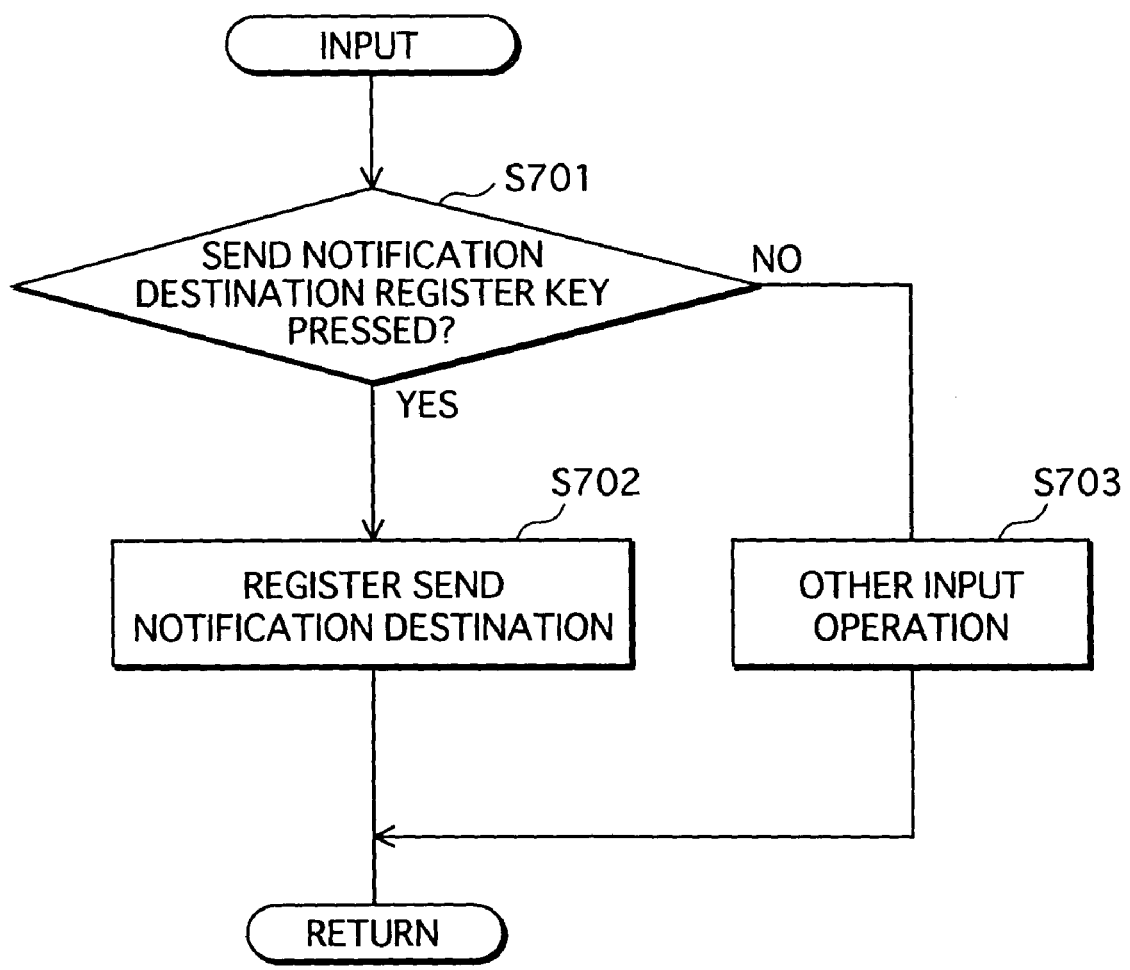
FIG. 22 is a flowchart showing an input process in FIG. 21.

FIG. 22 is a flowchart of the input process in step S602. In the input process, the MFP 530 judges whether the send notification destination register key 198 (see FIG. 12) is pressed (S701). In this embodiment, a send notification mail is sent before sending fax data. Accordingly, in a case where the original destination of the fax data is a fax device, a destination of the send notification mail needs to be set beforehand. In other words, a correspondence between the destination of the fax data (a fax number) and the destination of the send notification mail (a mail address) needs to be pre-registered in the MFP 530. The send notification destination register key 198 is a key used for pre-registering such information.

FIG. 23 shows an example table which holds information input via the send notification destination register key 198. As shown in the drawing, when a destination of fax data is a fax device, a destination (such as a PC located near the fax device) of a send notification mail corresponding to the fax data is registered using a mail address.

Figure 24:
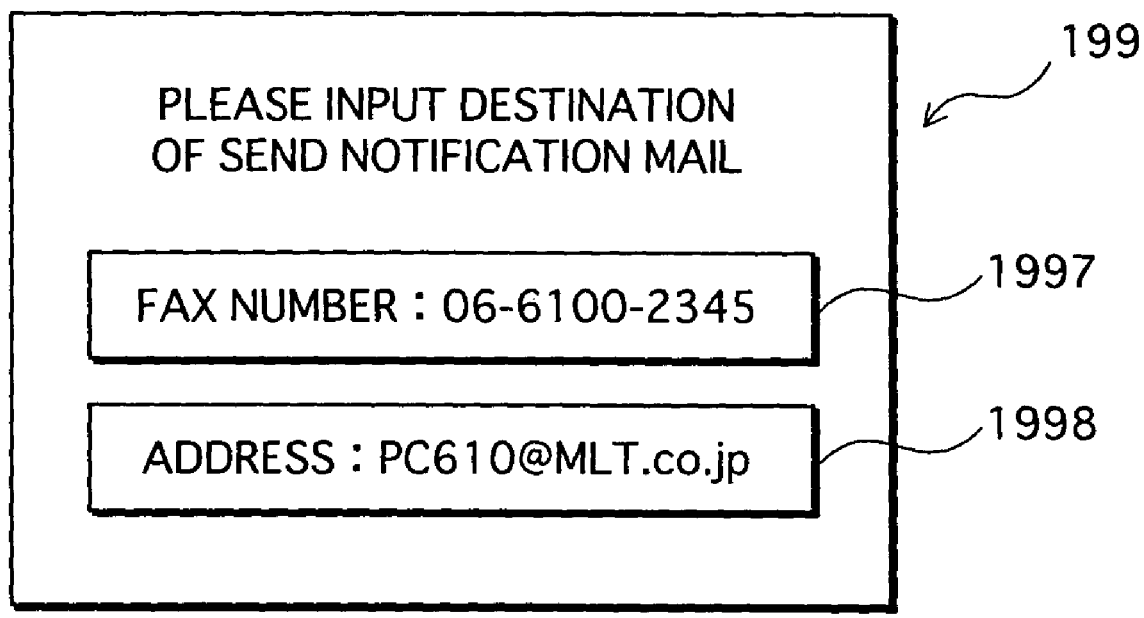
FIG. 24 shows an example screen displayed on the liquid crystal touch panel when a send notification destination register key is pressed.

Referring back to FIG. 22, if the send notification destination register key 198 is pressed (S701: YES), the MFP 530 displays a screen for registering a send notification destination, on the liquid crystal touch panel 199. FIG. 24 shows an example screen which is displayed on the liquid crystal touch panel 199 when the send notification destination register key 198 is pressed. The screen shown in FIG. 24 includes a fax number field 1997 and an address field 1998. A fax number is input in the fax number field 1997, whereas a mail address is input in the address field 1998. Based on such input information, the MFP 530 registers a mail address of a destination of a send notification mail in correspondence with a fax number of a destination of fax data (S702). Here, if the destination of the fax data is a device such as an MFP which can send/receive both a fax and an ifax, a mail address of the MFP may be registered in correspondence with a fax number of the MFP.

If the destination of the fax data is an ifax device, the send notification mail can be sent to the ifax device itself. In this case, it is not necessary to register information in the table, though for precautionary purposes such information may be registered.

If the send notification destination register key 198 is not pressed (S701: NO), the MFP 530 performs other input operations (S703). The other input operations referred to here correspond to when a key other than the send notification destination register key 198 is pressed (such as the numeric keypad 191), so that their detailed explanation has been omitted here.

Referring back to FIG. 21, after the input process (S602), the MFP 530 performs a document read process (S603). Which is to say, the MFP 530 reads a document using an image reading unit (scanner) equipped in the MFP 530 to generate image data. This operation is well known and so its detailed explanation has been omitted here. The generated image data, i.e., fax data, is given an identifier, and stored in a storage device such as a hard disk (S604). In this embodiment, it is necessary to assign the identifier to the fax data at this stage. Therefore, when the fax data is fax data of an ifax, an identifier (such as a job ID) different from the Message-ID of a mail for sending the fax data of the ifax is assigned to the fax data.

The MFP 530 then specifies a destination of a send notification mail for notifying that the fax data is going to be sent, with reference to the table shown in FIG. 23 and the like (S605). In more detail, when a fax number is designated as the destination of the fax data (i.e. when the fax data is fax data of a fax), the MFP 530 searches the table shown in FIG. 23 for the destination of the send notification mail corresponding to that fax number. If the destination of the send notification mail is not found in the table, a message may be displayed on the liquid crystal touch panel 199. When a mail address is designated as the destination of the fax data, on the other hand, the MFP 530 specifies the mail address as the destination of the send notification mail.

After this, the MFP 530 performs a process of preparing the send notification mail (S606). This process is fundamentally the same as that shown in FIG. 11 in the first embodiment, so that its detailed explanation has been omitted here. As a result of this process, the destination, the identifier of the fax data, and other information are set in the send notification mail.

The MFP 530 then performs a reception process (S607). In the reception process, the MFP 530 receives fax data of a fax over the public telephone line 300 or a mail from the mail server 520. The MFP 530 judges whether a reply mail to a send notification mail has been received in the reception process of step S607 (S608). If a reply mail has not been received (S608: NO), the MFP 530 performs other operations (S609) and then performs a send process (S610). If the send notification mail has been prepared in step S606, the MFP 530 sends the send notification mail in this send process of step S610.

If a reply mail has been received (S608: YES), the MFP 530 advances to step S611. So long as the reply mail is correct, it must contain information about a destination of fax data. Accordingly, the MFP 530 performs a process of extracting this information from the reply mail (S611). This process is fundamentally the same as that shown in FIG. 17 in the first embodiment, and so its detailed explanation has been omitted here.

The MFP 530 judges whether the send notification mail is required to be resent (S612). If so (S612: YES), the MFP 530 prepares the send notification mail (S613). Otherwise, the MFP 530 prepares the fax data (S614).

Figure 25:
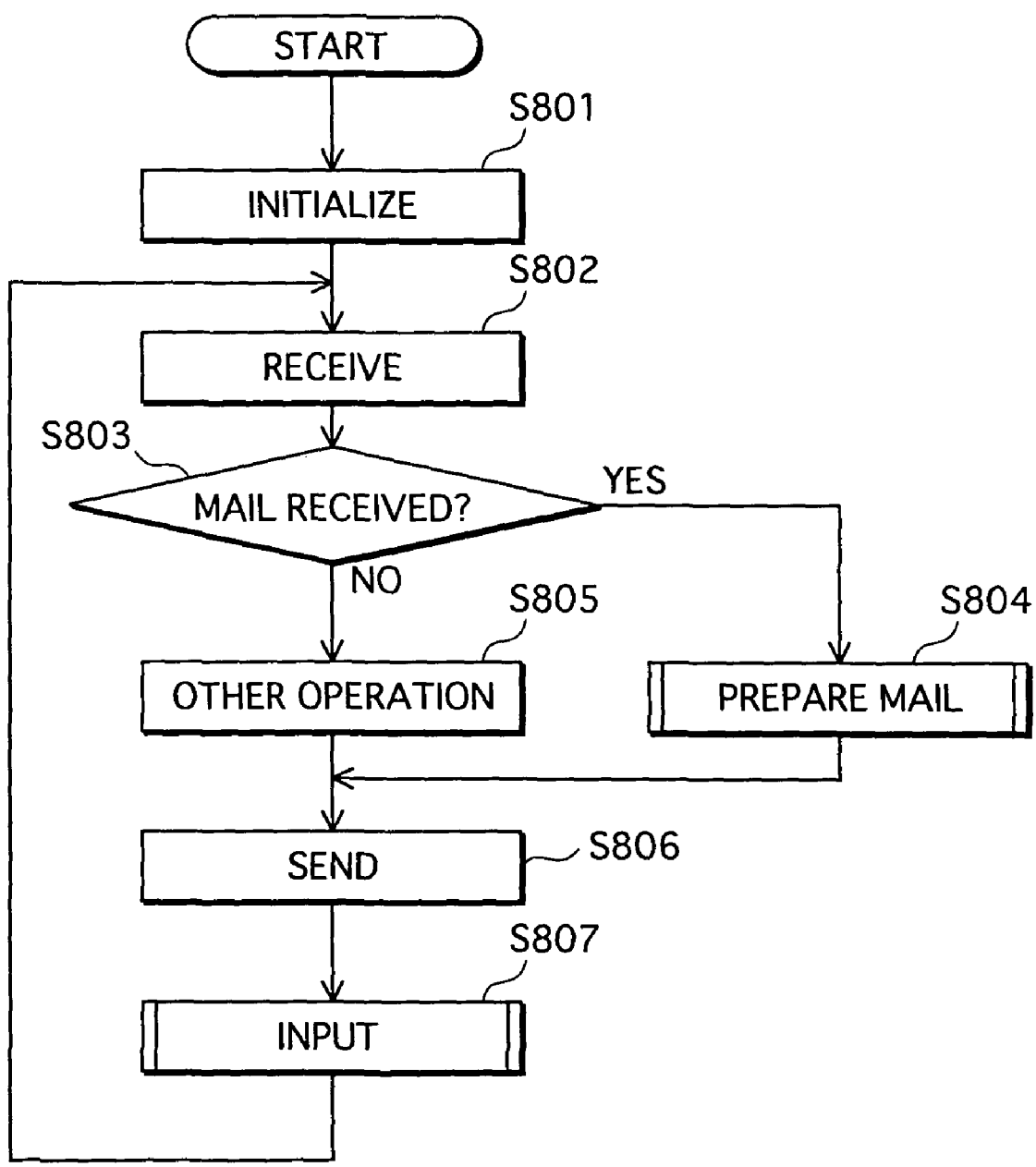
FIG. 25 is a flowchart showing processing performed by a receiver MFP in the second embodiment.

FIG. 25 is a flowchart of processing of the MFP 230 which receives a send notification mail from the MFP 530. Upon activation, the MFP 230 performs an initialization process (S801) and a reception process (S802), as in the first embodiment. The MFP 230 judges whether a send notification mail has been received in the reception process of step S802 (S803). If so (S803: YES), the MFP 230 prepares to forward the send notification mail to the mobile telephone 410 (S804).

Figure 26:
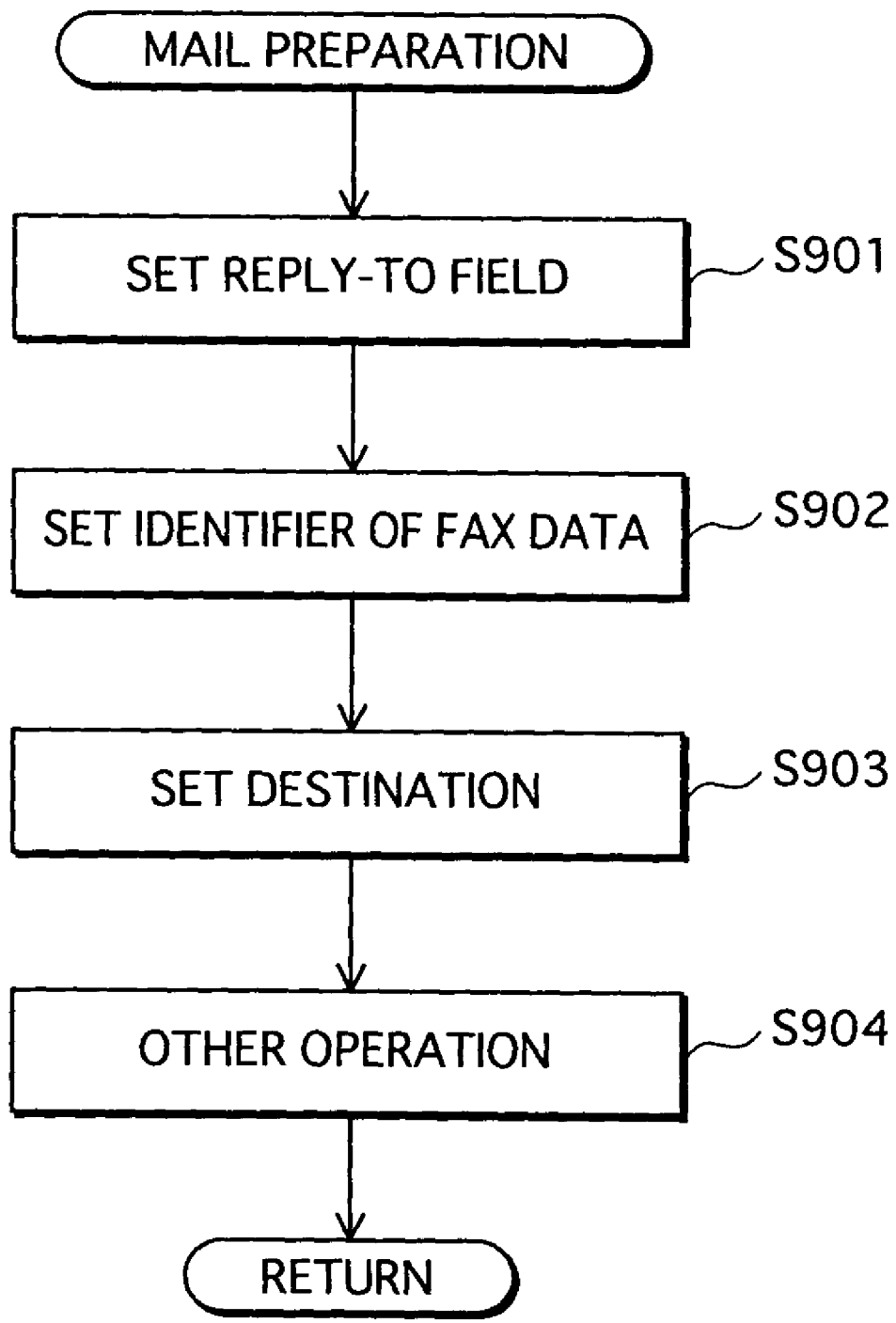
FIG. 26 is a flowchart showing a mail preparation process in FIG. 25.

FIG. 26 is a flowchart of the mail preparation process performed in step S804. The MFP 230 sets a "Reply-To" field (S901). The "Reply-To" field shows a destination of a reply mail to the send notification mail. In general, a reply mail is sent to a mail address shown in a "From" field in the header of the original mail. In this embodiment, however, the send notification mail is sent from the MFP 230 to the mobile telephone 410, but a reply mail to the send notification mail is sent from the mobile telephone 410 to the MFP 530. Accordingly, a mail address of the MFP 530 is set in the "Reply-To" field in the header of the send notification mail.

The MFP 230 then sets the identifier of the fax data in the message body of the send notification mail (S902). The MFP 230 also sets the destination of the send notification mail (the mobile telephone 410 in this embodiment) in the header of the send notification mail (S903). The MFP 230 performs other operations (S904) to complete the mail preparation process. The other operations referred to here are similar to those performed in step S303 in FIG. 11 in the first embodiment, and so their detailed explanation has been omitted here.

Figure 28:
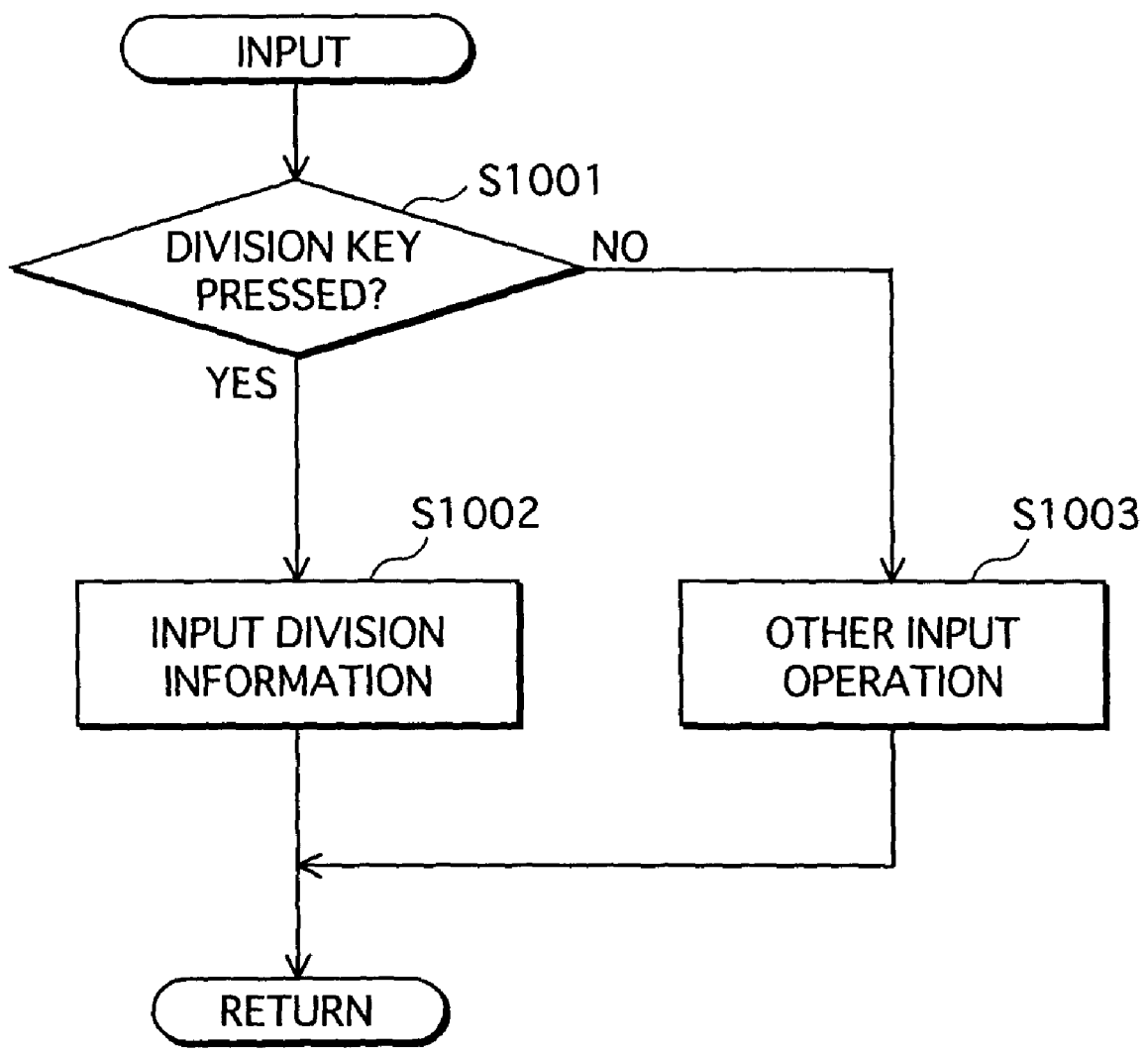
FIG. 28 is a flowchart showing an input process in FIG. 25.

Referring back to FIG. 25, after the send notification mail is prepared (S804), the MFP 230 performs a send process to forward the send notification mail to the mobile telephone 410 (S806). FIG. 27 shows an example of such a forwarded send notification mail. The MFP 230 then performs an input process (S807). FIG. 28 is a flowchart of the input process performed in step S807. Here, the MFP 230 receives an input when the division key 196 is pressed. This is the same as that in the first embodiment (FIG. 13) and so its explanation has been omitted here.

Figure 29:
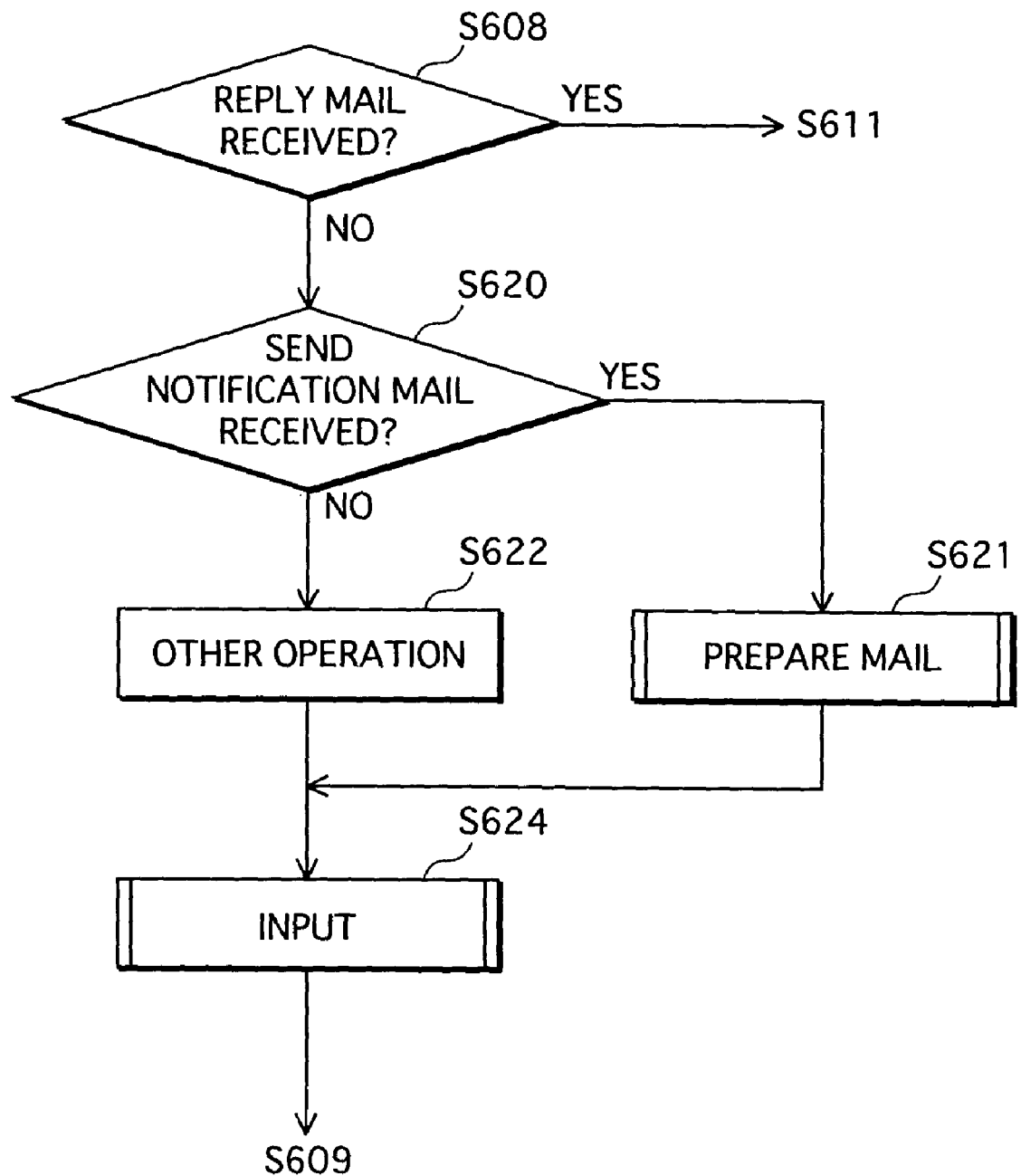
FIG. 29 is a flowchart showing an operation of a program of an MFP when the sender MFP and the receiver MFP are of the same model.

The above processing of the MFP 230 can be incorporated in a main program of the MFP 530. In other words, the MFP 230 and the MFP 530 may be realized by the same model. FIG. 29 is a flowchart of processing of such an MFP that combines the functions of the MFPs 230 and 530.

As shown in the drawing, when the MFP judges that a reply mail has not been received in step S608 (corresponding to step S608 in FIG. 21), the MFP judges whether a send notification mail has been received in step S620 (corresponding to step S803 in FIG. 25).

Following this, the MFP performs the same processes as those of steps S804, S805, and S807, in steps S621, S622, and S624. The MFP then proceeds to step S609 in FIG. 21. Here, the send process of step S806 in FIG. 25 is omitted because the send process is performed in step S610 in FIG. 21. Also, the input process of step S624 may be incorporated in the input process of step S602 in FIG. 21 (see FIG. 22).

Third Embodiment

In the third embodiment of the present invention, a sender device such as an MFP judges whether information about a destination of a send notification mail (a mail for notifying that fax data is going to be sent) is registered in the sender MFP. If such information is registered in the sender device, the sender device judges that the fax data needs to be sent to a destination different from the original destination. The sender device accordingly sends the send notification mail to an external device such as a mobile telephone. The sender device receives a reply mail to the send notification mail from the external device, and sends the fax data to a destination according to the reply mail.

To achieve this, if a user of a receiver device such as an MFP wants a send notification mail to be delivered to an external device such as a mobile telephone, the user notifies in advance each sender device which is registered in the receiver device of the destination of the send notification mail. An example construction of a fax data transmission system of this embodiment is shown in FIG. 18. The fax data transmission system of this embodiment is explained below, using an example where the MFP 530 is the sender device and the MFP 230 is the receiver device. In this example, the MFP 230 notifies each sender device such as the MFP 530 of a send notification mail destination in advance.

Figure 30:
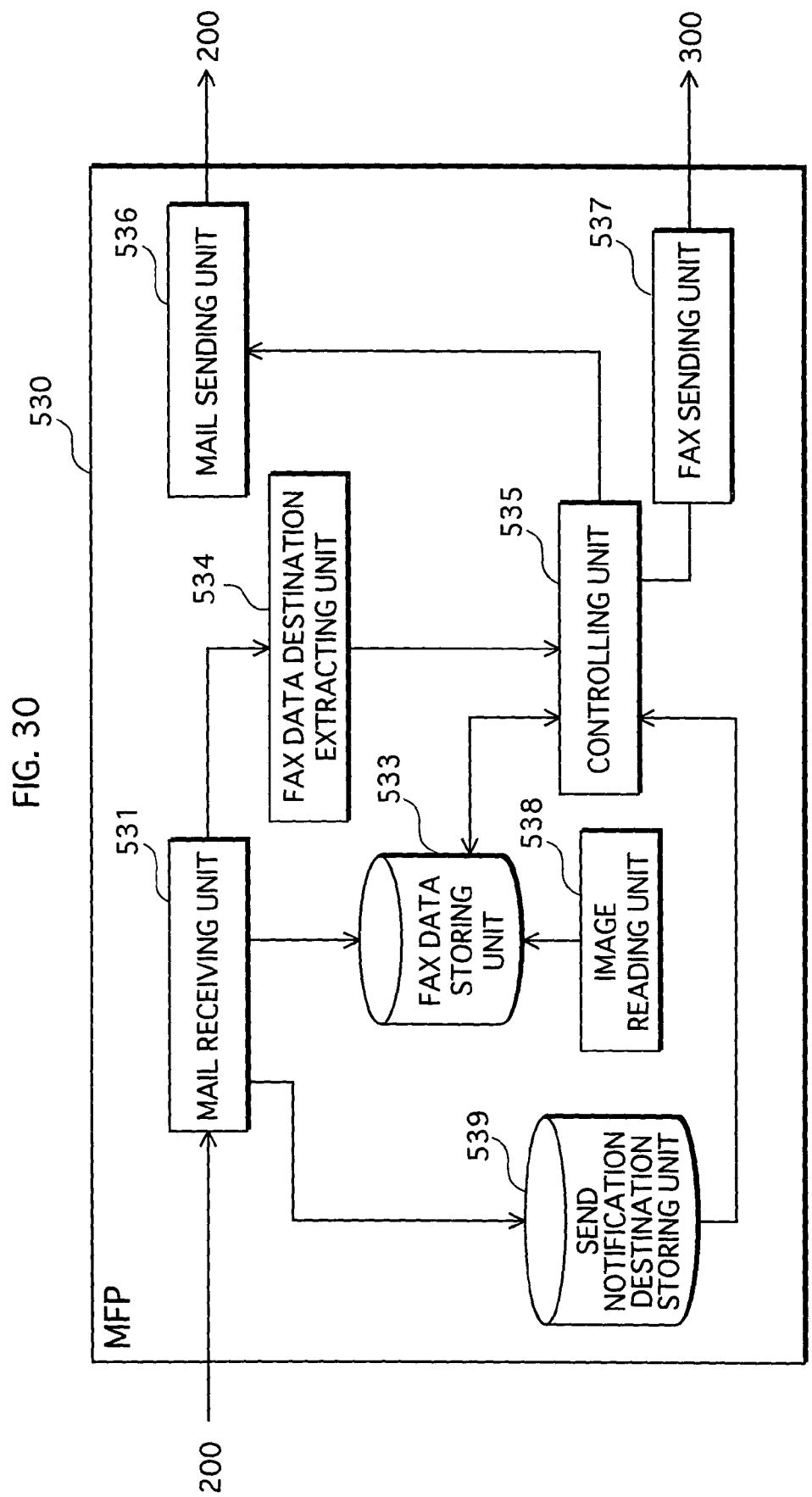
FIG. 30 is a functional block diagram showing a partial construction of a sender MFP in the third embodiment of the invention.

FIG. 30 is a functional block diagram showing a partial construction of the MFP 530 in this embodiment. In the drawing, the MFP 530 includes a mail receiving unit 531, a fax data storing unit 533, a fax data destination extracting unit 534, a controlling unit 535, a mail sending unit 536, a fax sending unit 537, an image reading unit 538, and a send notification destination storing unit 539.

The send notification destination storing unit 539 stores information about a send notification mail destination which has been sent from the MFP 230 and the like beforehand.

FIG. 31 shows an example of a send notification destination register mail sent from the MFP 230 to the MFP 530. As illustrated, the message body of the send notification destination register mail contains a mail address or fax number of the original destination of fax data (the MFP 230 in this embodiment), a division number, and a mail address of a send notification mail destination (the mobile telephone 410 in this embodiment). Suppose the fax data transmission system includes only ifax devices. In such a case, the contents of the "From" field in the header of the send notification destination register mail (the MFP 230 in FIG. 31) show the original destination of the fax data, so that the original destination of the fax data may be omitted from the message body of the send notification destination register mail. However, by defining the original destination of the fax data in the message body of the send notification destination register mail, it is possible not only to adapt to the case where the original destination of the fax data is a fax device, but also to send the send notification destination register mail from a device, such as a mobile telephone, other than the original destination.

The MFP 230 sends such a send notification destination register mail to each sender device registered in the MFP 230. Meanwhile, the MFP 530 receives a send notification destination register mail not only from the MFP 230 but also from other receiver devices such as MFPs. The MFP 530 stores information about a send notification mail destination shown in each received send notification destination register mail, in the send notification destination storing unit 539. FIG. 32 shows an example of the storage contents of the send notification destination storing unit 539.

Figure 33:
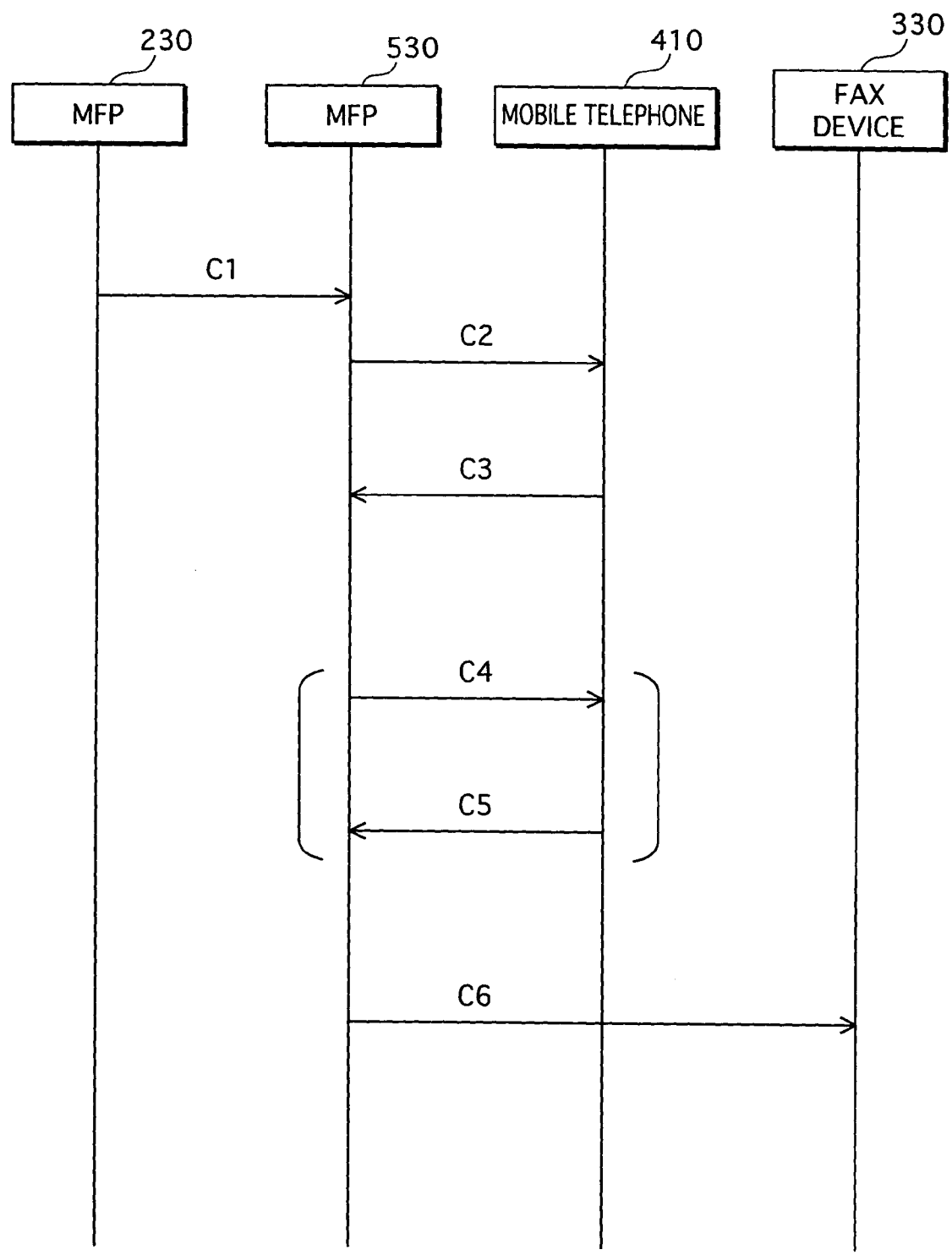
FIG. 33 is a sequence chart showing a fax data transmission operation in the third embodiment.

FIG. 33 is a sequence chart of a fax data transmission operation in this embodiment. The user of the MFP 230 (and the mobile telephone 410) sends a send notification destination register mail to the MFP 530 (C1). The send notification destination register mail contains information about a send notification mail destination (e.g. a mail address), as noted earlier. In this embodiment, the mobile telephone 410 is designated as the send notification mail destination. The MFP 230 sends the same send notification destination register mail to every sender device registered in the MFP 230.

The MFP 530 receives the send notification destination register mail from the MFP 230, and stores the information contained in the send notification destination register mail in the send notification destination storing unit 539. After this, when fax data needs to be sent to the MFP 230, the MFP 530 refers to the send notification destination storing unit 539. The send notification destination storing unit 539 stores the information which designates the mobile telephone 410 as the send notification mail destination corresponding to the MFP 230. Accordingly, the MFP 530 sends a send notification mail to the mobile telephone 410 (C2). FIG. 34 shows an example send notification mail in this embodiment. This send notification mail is identical to that shown in FIG. 20 in the second embodiment, except that the mobile telephone 410 is set in the "To" field of the header instead of the MFP 230.

The mobile telephone 410 receives the send notification mail from the MFP 530. The mobile telephone 410 then sends information for specifying a destination to which the fax data should actually be sent, as a reply mail to the send notification mail (C3). A method of designating the destination of the fax data is the same as in the above embodiments. If the reply mail does not include information about the destination of the fax data, the send notification mail may be resent (C4 and C5) as in the above embodiments. Also, the mobile telephone 410 may use location information as in the above embodiments. The MFP 530 sends the fax data to the destination specified in the reply mail (the fax device 330 in this embodiment) (C6).

Figure 35:
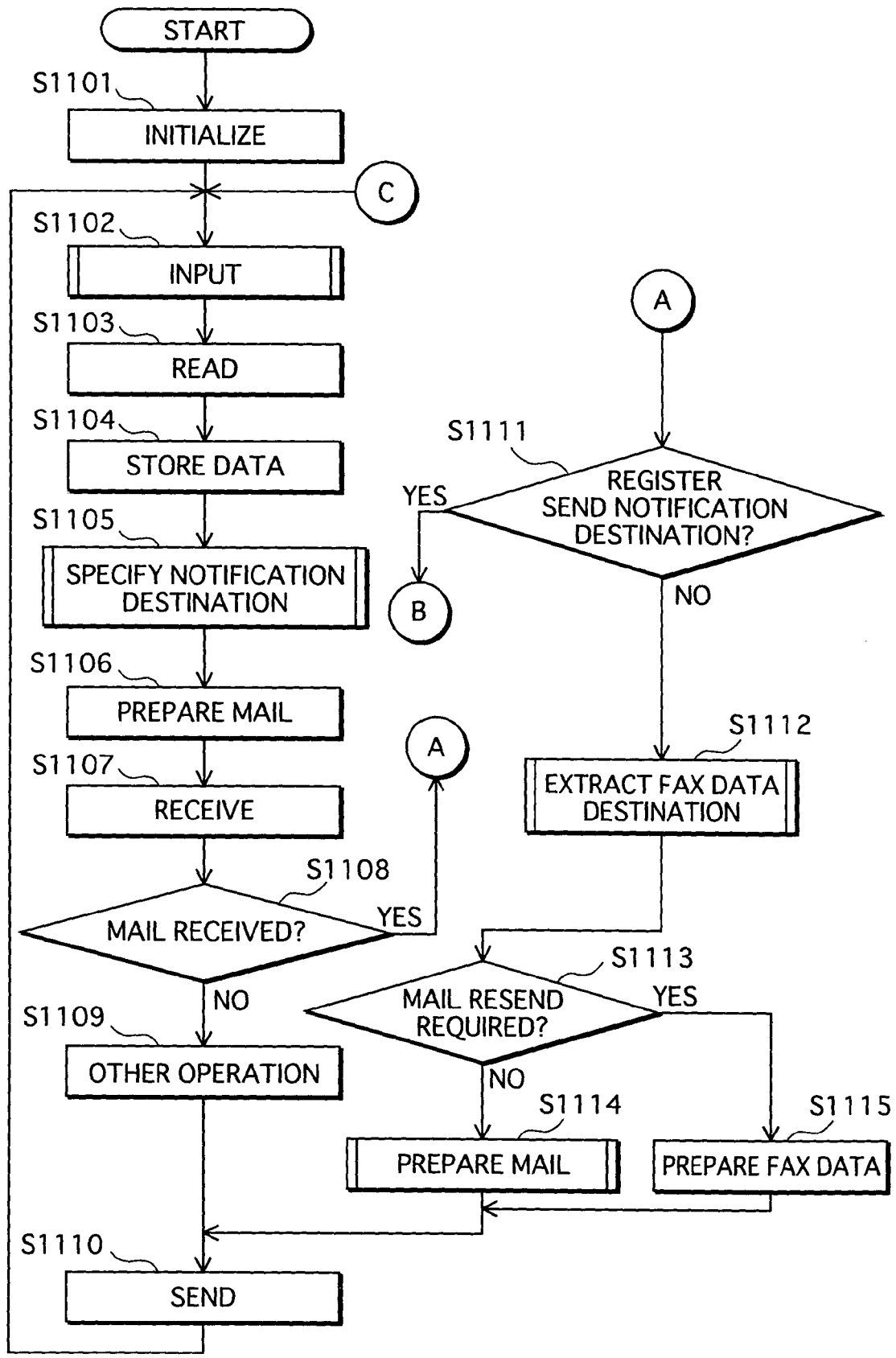
FIG. 35 is a flowchart showing processing performed by the sender MFP in the third embodiment.

FIG. 35 is a flowchart of processing of the MFP 530 in this embodiment. The contents of this processing are similar to those in the second embodiment, and differ from the second embodiment only in the following points.

The processing of the MFP 530 in this embodiment differs from that in the second embodiment in the contents of the input process (S1102). In the input process, an input of a destination of a send notification destination register mail is received. Which is to say, this flowchart also applies to the processing of the MFP 230.

Figure 36:
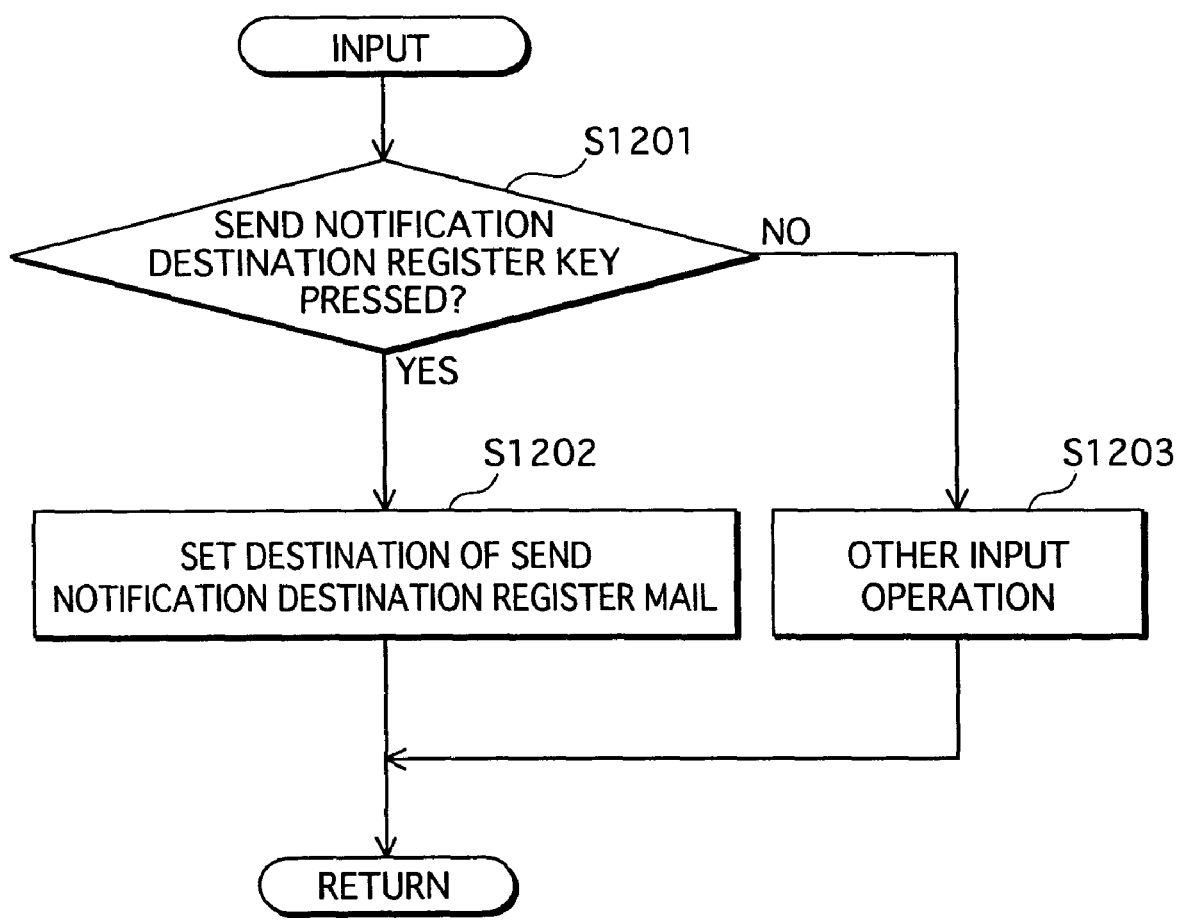
FIG. 36 is a flowchart showing an input process in FIG. 35, which is performed by the receiver MFP.
Figure 37:
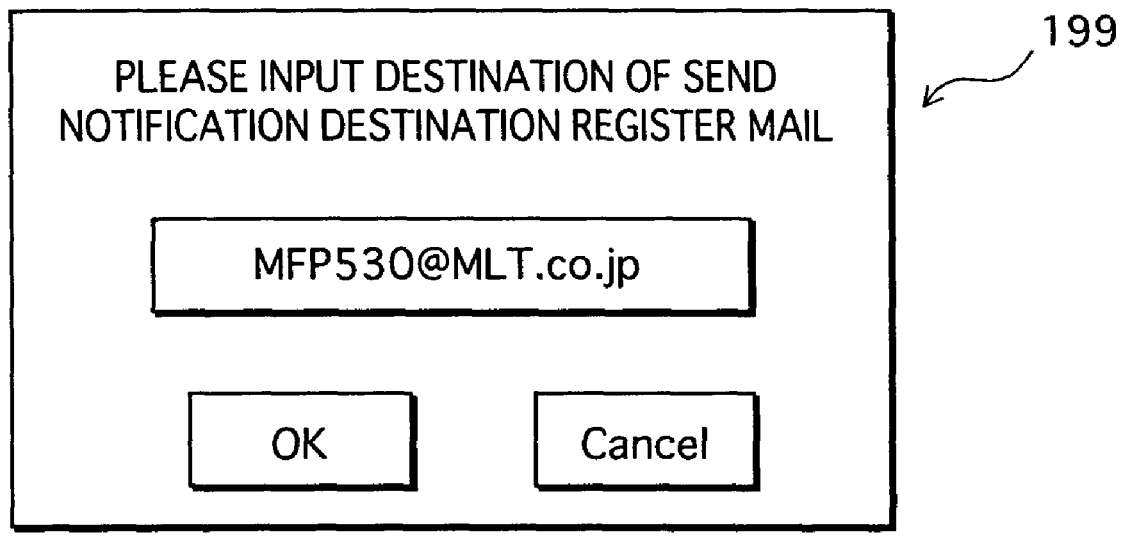
FIG. 37 shows an example screen displayed on the liquid crystal touch panel, when inputting a destination of a send notification destination register mail.

FIG. 36 is a flowchart of the input process performed in step S1102. The MFP judges whether the send notification destination register key 198 is pressed (S1201). If the send notification destination register key 198 is pressed (S1201: YES), the MFP sets a destination of a send notification destination register mail (S1202). For example, a screen such as the one shown in FIG. 37 is displayed on the liquid crystal touch panel 199, to prompt the user to input the destination of the send notification destination register mail. The input information is stored in a table in the MFP. If the send notification destination register key 198 is not pressed (S1201: NO), the MFP performs other input operations (S1203). The other input operations referred to here correspond to when a key other than the send notification destination register key 198 is pressed, and so their explanation has been omitted here. In this embodiment, the destination of the send notification destination register mail is set when the send notification destination register key 198 is pressed. However, if the method of the second embodiment is combined with the method of the third embodiment, a different key may be used in the third embodiment. As an alternative, when the send notification destination register key 198 is pressed, a menu screen may be displayed on the liquid crystal touch panel 199 for the user to select either an operation of setting a destination of a send notification destination register mail or an operation of setting a destination of a send notification mail.

The processing of the MFP 530 in this embodiment also differs from the second embodiment in that the MFP 530 judges whether a mail received in a reception process of step S1107 is a send notification destination register mail (S1111). This judgment can be made by checking whether the message body of the received mail includes text indicating that the mail is a send notification destination register mail.

Figure 38:
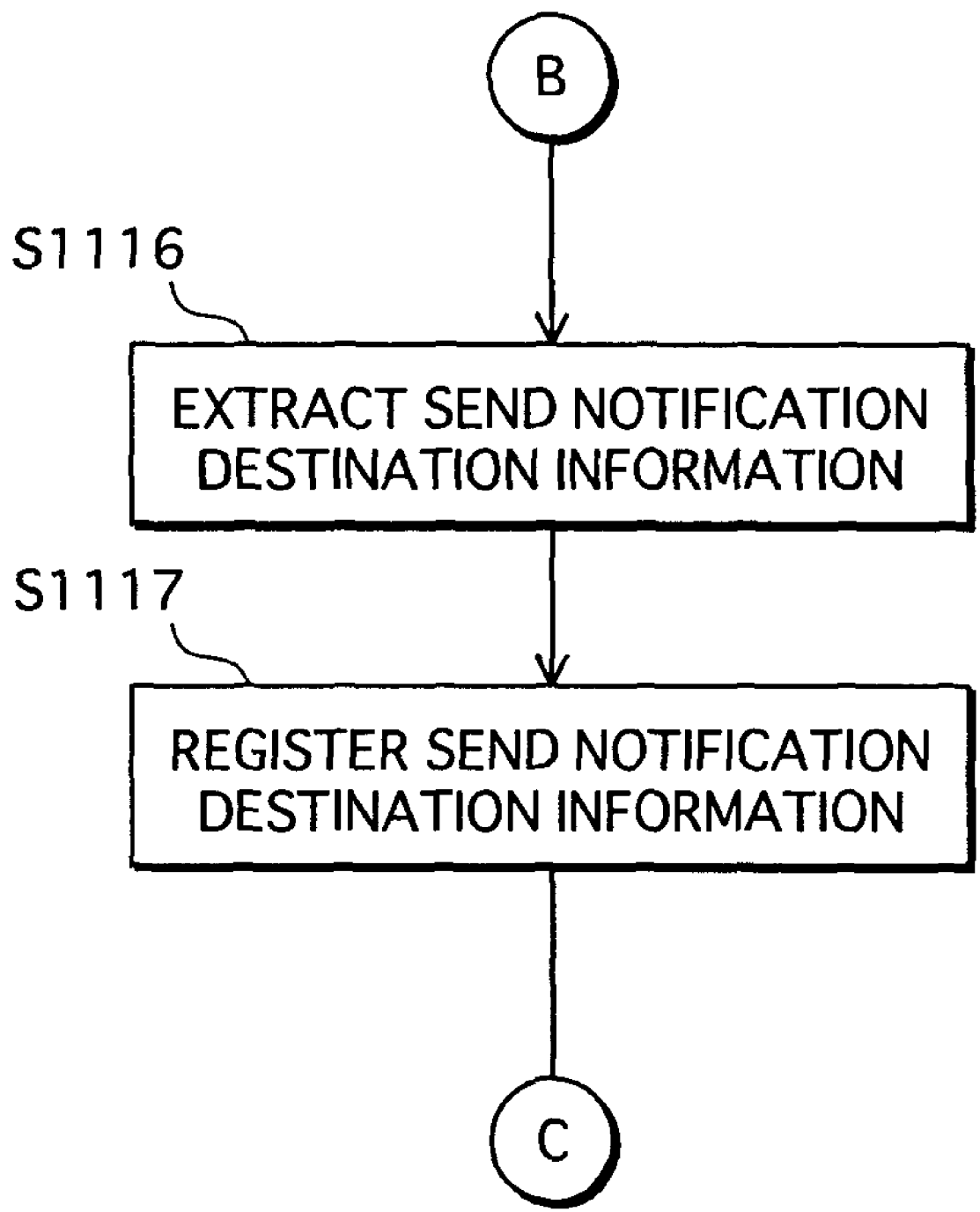
FIG. 38 is a flowchart showing processing performed by the sender MFP in the third embodiment.

If the received mail is not a send notification destination register mail (S1111: NO), the received mail is, for example, a mail from the mobile telephone 410 which contains information about a destination of fax data. Accordingly, the MFP 530 performs the same processes as in the second embodiment (S1112 to S1115). If the received mail is a send notification destination register mail (S1111: YES), the MFP 530 performs a process of storing information included in the mail in a table such as the one shown in FIG. 32. FIG. 38 is a flowchart of such a process. The MFP 530 extracts information about a send notification destination from the send notification destination register mail (S1116), and registers it in the table (S1117).

Although the MFP 530 acquires information such as that shown in FIG. 32 from another device in this embodiment, such information may be input by an operator of the MFP 530.

Operations such as fax data transmission described in the above embodiments can be achieved not only by a program which is stored in a fixed storage unit such as a ROM in an MFP (such a program may be updated if stored in a flash ROM or the like as firmware), but also by a program which is installed in a general-purpose information processing device such as a PC.

A program which achieves the present invention may also be stored on a computer-readable storage medium. Examples of such a computer-readable storage medium include magnetic tape, a magnetic disk such as a flexible disk, an optical storage medium such as a DVD, a CD-ROM, a CD-R, an MO, or a PD, and a flash memory device such as SmartMedia (trademark) or CompactFlash (trademark) A program which achieves the present invention may be manufactured and assigned having been stored on a computer-readable storage medium. A program which achieves the present invention may also be transmitted via a network such as an electronic communications network, a broadcast network, a satellite communications network, a wired or wireless communications network, or the Internet.

A program which achieves the present invention does not need to include all modules for executing the above operations on a computer. For example, the above operations may be executed on a computer through the use of a general-purpose program, such as a communications program and a program included in an operating system (OS), that can be installed separately in an information processing device. In other words, it is not necessary to store all of the modules on the aforementioned computer-readable storage medium. Likewise, it is not necessary to transmit all of the modules via the aforementioned network. Furthermore, predetermined operations may be executed using dedicated hardware.

Modifications

The present invention has been described by way of the above embodiments, though it should be obvious that the present invention is not limited to the above. Example modifications are given below.

The first embodiment describes the case where the MFP 230 notifies of receipt of fax data using an Internet mail. The use of an Internet mail here has the following advantages.

In general, the message body of an Internet mail is a sequence of text lines. Hence it is easy to process the contents of the message body, such as by adding a fax number, a mail address, or location information as information for specifying a destination of fax data. Also, since an Internet mail is widely used, it is unnecessary to prepare a new communications line to achieve the present invention.

This, however, does not mean the notification of receipt of fax data is limited to an Internet mail. For instance, the notification may be made by sound.

As one example, a voice message such as "Fax data has been received. Please input information about a destination of the fax data." may be sent to the mobile telephone 410 using a voice synthesis method and the like. Having received such a voice message, the user can input a fax number or a mail address using a numeric keypad on the mobile telephone 410. Here, a voice recognition method may be employed to identify a fax number or a mail address spoken by the user. The same applies to a reply to a send notification mail in the second embodiment and a reply to a send notification mail in the third embodiment.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A fax data transmission device comprising:
a first storing unit operable to store fax data and an identifier for identifying the fax data, in correspondence with each other;
a second storing unit operable to store information showing a correspondence between an original destination of the fax data and a send information destination, the send information destination being a destination of send information which includes the identifier and a notification that the fax data identified by the identifier is going to be sent;
a notifying unit operable to send the send information to the send information destination corresponding to the original destination of the fax data, with reference to the information stored in the second storing unit;
a receiving unit operable to receive as a reply to the send information, destination information from the send information destination for specifying a destination to which the fax data should actually be sent, and extract the destination information from the reply; and
a sending unit operable to send the fax data to the destination specified by the extracted destination information;
wherein the notifying unit sends the send information via an Internet mail, and
the receiving unit extracts the destination information from a mail replying to the Internet mail.

2. The fax data transmission device of claim 1, wherein the notifying unit places the identifier in a message body of the Internet mail.

3. The fax data transmission device of claim 1, wherein the destination information includes location information showing a location of an external device, and
the destination to which the fax data should actually be sent is determined based on the location information.

4. The fax data transmission device of claim 1, being a multi-functional image forming device which has a copy function of reading a document and forming an image on a recording sheet based on data obtained by reading the document, and a print function of forming an image on a recording sheet based on incoming data.

5. The fax data transmission device of claim 1 further comprising:
a notification destination information receiving unit operable to receive the information showing the correspondence between the original destination of the fax data and the send information destination, from outside of the fax data transmission device,
wherein the second storing unit stores the information received by the notification destination information receiving unit.

6. The fax data transmission device of claim 1, wherein the identifier is included in a message body of the Internet mail.

7. A fax data transmission system comprising a fax data transmission device, an information communication device, and a portable communication device,
the information communication device including:
a first sending unit operable to send information showing a correspondence between an original destination of fax data and a send information destination, to the fax data transmission device,
the fax data transmission device including:
a first receiving unit operable to receive the information from the first sending unit in the information communication device;
a first storing unit operable to store the fax data and an identifier for identifying the fax data, in correspondence with each other;
a second storing unit operable to store the information received by the first receiving unit;
a notifying unit operable to send send information to the send information destination corresponding to the original destination of the fax data with reference to the information stored in the second storing unit, the send information including the identifier and a notification that the fax data identified by the identifier is going to be sent;
a second receiving unit operable to receive destination information for specifying a destination to which the fax data should actually be sent, as a reply to the send information; and a second sending unit operable to send the fax data to the destination specified by the destination information, and the portable communication device including:

a third receiving unit operable to receive the send information from the notifying unit in the fax data transmission device, when designated as the send information destination; and a replying unit operable to send the destination information to the fax data transmission device.

8. The fax data transmission system of claim 7, wherein the second receiving unit extracts the destination information from the reply to the send information.

* * * * *